(12) United States Patent
Marakkala Manage

(10) Patent No.: US 10,730,136 B2
(45) Date of Patent: Aug. 4, 2020

(54) ROTARY CHANGER

(71) Applicant: TIPMAN CO., LTD., Aichi (JP)

(72) Inventor: Anura Silva Marakkala Manage, Aichi (JP)

(73) Assignee: TIPMAN CO., LTD., Miyoshi-Shi (JP)

( * ) Notice: Subject to any disclaimer, the term of this patent is extended or adjusted under 35 U.S.C. 154(b) by 528 days.

(21) Appl. No.: 15/584,792

(22) Filed: May 2, 2017

(65) Prior Publication Data

US 2017/0232546 A1 Aug. 17, 2017

Related U.S. Application Data

(63) Continuation of application No. PCT/JP2016/003511, filed on Jul. 28, 2016.

(30) Foreign Application Priority Data

Sep. 15, 2015 (JP) ................................ 2015-182054
Feb. 8, 2016 (JP) ................................ 2016-021875

(51) Int. Cl.
| | | |
|---|---|---|
| B23K 11/30 | (2006.01) | |
| B23K 9/26 | (2006.01) | |
| B23K 9/12 | (2006.01) | |
| B23B 31/12 | (2006.01) | |
| B23Q 3/155 | (2006.01) | |

(52) U.S. Cl.
CPC ...... *B23K 11/3072* (2013.01); *B23B 31/1261* (2013.01); *B23K 9/12* (2013.01); *B23K 9/26* (2013.01); *B23Q 3/15566* (2013.01); *B23Q 3/15506* (2013.01); *Y10T 279/17231* (2015.01); *Y10T 483/17* (2015.01)

(58) Field of Classification Search
CPC ........ B23K 9/12; B23K 9/26; B23K 11/3072; B23Q 3/15506; B23Q 3/15566; B23B 31/1261; Y10T 483/17
See application file for complete search history.

(56) References Cited

U.S. PATENT DOCUMENTS

| | | |
|---|---|---|
| 3,398,965 A | 8/1968 | Cox |
| 4,645,901 A | 2/1987 | Scholz et al. |
| 4,755,981 A | 7/1988 | Ekhoff |
| 4,935,595 A * | 6/1990 | Fuse .................. B23K 11/3072 |
| | | 219/86.25 |

(Continued)

FOREIGN PATENT DOCUMENTS

| | | |
|---|---|---|
| EP | 2639005 A2 | 9/2013 |
| JP | H03-23078 A | 1/1991 |

(Continued)

OTHER PUBLICATIONS

CN Office Action dated Dec. 3, 2018 in application No. 201680003530.9.

(Continued)

*Primary Examiner* — Eric A. Gates
(74) *Attorney, Agent, or Firm* — Maschoff Brennan

(57) ABSTRACT

On an inner peripheral surface defining a through hole of a first rotator, provided is a positioning member for bringing the center axis of a contact tip, housed in the through hole, into alignment with a rotational axis, or making the former axis proximate to the latter axis, by coming into contact with an outer peripheral surface of the contact tip.

1 Claim, 36 Drawing Sheets

(56) References Cited

U.S. PATENT DOCUMENTS

| | | | |
|---|---|---|---|
| 5,971,403 A | 10/1999 | Yahagi et al. | |
| 9,505,080 B2* | 11/2016 | Nakajima | B23K 11/3063 |
| 10,427,240 B2* | 10/2019 | Choi | B23K 37/0241 |
| 2005/0211684 A1 | 9/2005 | Jaeger et al. | |
| 2012/0125903 A1* | 5/2012 | Izutani | B23K 9/173 |
| | | | 219/136 |
| 2013/0008003 A1* | 1/2013 | Izutani | B23K 9/26 |
| | | | 29/402.08 |
| 2015/0217397 A1* | 8/2015 | Nakajima | B23K 11/3063 |
| | | | 29/50 |

FOREIGN PATENT DOCUMENTS

| | | |
|---|---|---|
| JP | H04-017752 B2 | 3/1992 |
| JP | H4-87708 A | 3/1992 |
| JP | H04-138873 A | 5/1992 |
| JP | H06-079462 A | 3/1994 |
| JP | H11-347731 A | 12/1999 |
| JP | 2001-105134 A | 4/2001 |
| JP | 2001105134 A | 4/2001 |
| JP | 2002-192345 A | 7/2002 |
| JP | 2007-530283 A | 11/2007 |
| JP | 2010-149145 A | 7/2010 |
| JP | 2012-130928 A | 7/2012 |
| KR | 2000-0011276 | 2/2000 |

OTHER PUBLICATIONS

European Search Report dated Dec. 18, 2017 in application No. 16845869.3.
KR Office Action dated Jun. 8, 2018 in application No. 038969729.
International Search Report dated Oct. 11, 2016 in application No. PCT/JP2016/003511.
JP Office Action in Application No. 2017-540462 dated Jun. 9, 2020.

* cited by examiner

ROTARY CHANGER

CROSS-REFERENCE TO RELATED APPLICATION

This is a continuation of International Application No. PCT/JP2016/003511 filed on Jul. 28, 2016, which claims priority to Japanese Patent Application No. 2015-182054 filed on Sep. 15, 2015 and Japanese Patent Application No. 2016-021875 filed on Feb. 8, 2016. The entire disclosures of these applications are hereby incorporated by reference.

BACKGROUND

The present disclosure relates to a rotary changer configured to replace a nozzle or contact tip attached to a tip end portion of the torch body of a welding torch for use in arc welding.

Rotary changer assemblies for replacing torch components automatically and efficiently have been known in the art. Examples of such torch components include cylindrical nozzles and contact tip bars attached to a tip end portion of a welding torch for use in arc welding. A rotary changer assembly of this type is disclosed, for example, in Japanese Unexamined Patent Publication No. 2002-192345.

The rotary changer assembly includes a plurality of changers, each having a recess that opens at the top. Each of those changers is designed to be driven in rotation on a vertically extending rotational axis by a drive motor and a gear meshing mechanism. To remove the torch component from the torch body, the torch component is inserted into the recess with the changer kept rotating, thereby getting the recess interlocked with the torch component and rotating the torch component along with the changer to allow the torch component to be removed from the torch body. Meanwhile, to attach the torch component to the torch body, the torch component is placed in the changer such that its tip end faces downward and the torch body is gradually moved downward with the changer kept rotating. In this manner, the torch component is attached onto the tip end portion of the torch body.

While the torch component is being attached onto, or removed from, the torch body, misalignment of the center axis of the torch component with the rotation center axis of the changer would possibly cause deformation or damage to the torch body or the torch component.

Thus, to avoid such a situation, the rotary changer assembly of Japanese Unexamined Patent Publication No. 2002-192345 provides a guide plate over the changer. The guide plate has a tapered insertion hole with a downwardly decreasing diameter, which is arranged to face the top opening of the changer. The rotary changer assembly is designed to bring the center axis of the torch component into alignment with the rotation center axis of the changer, or at least make the former axis proximate to the latter, when the torch component is inserted into the insertion hole from over the changer.

Providing such a guide plate over the changer as is done in Japanese Unexamined Patent Publication No. 2002-192345, however, would make the changer assembly bulky in the direction in which the rotation center axis of the changer extends.

The present disclosure provides a rotary changer having its size reduced in the direction in which the rotation center axis of its rotator, on/from which a torch component is going to be attached or removed, extends.

SUMMARY

According to the present disclosure, a means for bringing the center axis of a torch component into alignment with the rotation center axis of a rotator, or at least making the former axis proximate to the latter, is provided inside the rotator.

Specifically, the present disclosure is directed to a rotary changer including a rotator having a hollow inside. The hollow is able to house a cylindrical or bar-shaped torch component of a welding torch such that the center axis of the torch component is aligned with the rotational axis of the rotator. The rotary changer is configured to attach or remove the torch component onto/from a torch body by allowing the torch component to turn on its center axis through the rotary movement of the rotator. The present disclosure provides the following solutions.

Particularly, according to a first aspect of the present disclosure, an inner peripheral surface of the rotator defining the hollow is provided with a positioning member for bringing the center axis of the torch component into alignment with the rotational axis, or at least making the center axis proximate to the rotational axis, by coming into contact with an outer peripheral surface of the torch component housed in the hollow.

A second aspect of the present disclosure is an embodiment of the first aspect. In the second aspect, the positioning member is an interlocking member configured to move forward or backward in a direction intersecting with the rotational axis, to come into contact, and get engaged, with the outer peripheral surface of the torch component when allowed to move forward with the torch component housed in the hollow, and to go out of contact with, and get disengaged from, the outer peripheral surface of the torch component when allowed to move backward. The rotator is configured to remove or attach the torch component from/onto the torch body by allowing the torch component to turn on its center axis while rotating itself with the interlocking member engaged with the torch component.

A third aspect of the present disclosure is an embodiment of the second aspect. In the third aspect, the rotary changer includes a clamping tool comprised of an annular member and a plurality of interlocking members including the interlocking member. The annular member is attached to the rotator and configured to be rotatable with respect to the rotator with its centerline aligned with the rotational axis of the rotator. The plurality of the interlocking members are arranged at regular intervals inside the rotator and around the rotational axis and pivotally supported by the annular member with a spindle extending in the same direction as the rotational axis so as to be pivotally movable toward the rotational axis. The inner peripheral surface of the rotator has a plurality of depressions opening toward the rotational axis and arranged at regular intervals around the rotational axis in association with the respective interlocking members. Each of the interlocking members has a projection to loosely fit into an associated one of the depressions. Rotating the rotator on the rotational axis in a normal direction rotation direction with the torch component housed in the hollow to make respective inner faces of the depressions press the respective projections in the normal direction rotation direction through the normal direction rotation of the rotator with respect to the clamping tool allows the respective interlocking members to pivotally move forward toward the rotational axis, press the outer peripheral surface of the torch component, and clamp the torch component. Further rotating the rotator in the normal direction rotation direction allows the torch component to turn along with the clamping tool and thereby be attached onto, or removed from, the torch body.

A fourth aspect of the present disclosure is an embodiment of the second aspect. In the fourth aspect, the torch component is a contact tip having a flat surface extending parallel to the center axis and a projecting portion projecting laterally outward from the flat surface. The flat surface and the projecting portion are provided in this order on the outer peripheral surface of the contact tip such that the flat surface is located closer to a tip end of the contact tip than the projecting portion is. The hollow of the rotator extends vertically along the rotational axis and opens both at top and at bottom. A communication hole extending horizontally to communicate with the hollow is cut through a peripheral wall of the rotator. The interlocking member is provided for the communication hole so as to move forward and backward in its communication direction and configured to pop out into the hollow and come into contact, and get engaged, with the flat surface of the contact tip when allowed to move forward and to go out of contact with the flat surface of the contact tip and retract into the communication hole when allowed to move backward.

A fifth aspect of the present disclosure is an embodiment of the fourth aspect. In the fifth aspect, the flat surface of the contact tip includes a pair of flat surfaces arranged symmetrically with respect to the center axis of the contact tip. The communication hole includes a pair of communication holes arranged symmetrically with respect to the rotational axis of the rotator. The interlocking member is provided for each of the communication holes.

A sixth aspect of the present disclosure is an embodiment of the fourth or fifth aspect. In the sixth aspect, the rotary changer includes a housing case defining an inner space to house the rotator in an upwardly or downwardly movable state. An inner surface of the housing case has an annular projection that protrudes toward the rotational axis and has a protruding end facet to make a slidable contact with the outer peripheral surface of the rotator. A rear end of the interlocking member is configured to retract into the communication hole when the interlocking member is allowed to move forward and to pop out into a gap between the housing case and the rotator when the interlocking member is allowed to move backward. The annular projection is switchable between a state of covering the communication hole and a state of uncovering the communication hole by upward or downward movement of the rotator.

A seventh aspect of the present disclosure is an embodiment of the sixth aspect. In the seventh aspect, the rotary changer includes a first biasing member for biasing the interlocking member toward the hollow to allow a frontend of the interlocking member to pop out into the hollow; and a second biasing member for biasing the rotator upward to allow the annular projection to face the communication hole in which the rear end of the interlocking member has retracted.

An eighth aspect of the present disclosure is an embodiment of the seventh aspect. In the eighth aspect, the first biasing member is configured as an O-ring of rubber extending annularly around the rotational axis of the rotator and contacting with the rear end of the interlocking member.

A ninth aspect of the present disclosure is an embodiment of the eighth aspect. In the ninth aspect, the interlocking member has, at its rear end, a recessed groove which extends around the rotational axis of the rotator and in which the O-ring is fitted.

A tenth aspect of the present disclosure is an embodiment of the seventh aspect. In the tenth aspect, the interlocking member has, at a top of its frontend, a first sloped surface that gradually slopes downward with decreasing distance from the rotational axis of the rotator.

An eleventh aspect of the present disclosure is an embodiment of the sixth aspect. In the eleventh aspect, the annular projection is provided with a cam member for allowing the interlocking member to move forward as the rotator is moved upward or downward.

A twelfth aspect of the present disclosure is an embodiment of the eleventh aspect. In the twelfth aspect, the cam member is a second sloped surface formed to face the top or bottom of the protruding end facet of the annular projection.

A thirteenth aspect of the present disclosure is an embodiment of the twelfth aspect. In the thirteenth aspect, the rotary changer includes a third biasing member for biasing the rotator upward such that the communication hole is located over the cam member. The rotator includes a contact portion to contact with the torch body when the contact tip is inserted into the hollow from over the rotator. The second sloped surface is formed to face the top of the protruding end facet of the annular projection.

A fourteenth aspect of the present disclosure is an embodiment of the third aspect. In the fourteenth aspect, the rotator has an opening in only one of two directions along its rotational axis and is configured to receive and house the torch component inside the hollow through the opening. The rotary changer comprises a fourth biasing member for biasing the rotator in the one direction along the rotational axis.

According to the first aspect of the present disclosure, inserting the torch component in the hollow of the rotator will make the positioning member bring the center axis of the torch component into alignment with the rotational axis of the rotator, or at least make the center axis proximate to the rotational axis. This eliminates the need for providing any guide plate such as the one disclosed in Japanese Unexamined Patent Publication No. 2002-192345 outside the rotator, thus reducing the size of the changer in the direction in which the rotational axis of the rotator extends.

According to the second aspect of the present disclosure, the relative positions of the torch component and the interlocking member may be changed in a direction intersecting with the rotational axis. Thus, allowing the interlocking member to move backward in advance toward a position where the interlocking member can avoid contact with the torch component while inserting the torch component into the hollow of the rotator can minimize the deformation or damage that could be caused around the interlocking member. Meanwhile, allowing the interlocking member to move forward will bring its frontend portion into contact with the outer peripheral surface of the torch component, thus not only determining the position of the torch component with respect to the rotator but also attaching or removing the torch component in conjunction with the outer peripheral surface of the torch component.

According to the third aspect of the present disclosure, as the rotator is allowed to rotate to either attach or remove the torch component onto/from the torch body, the respective interlocking members' pressing force on the torch component will increase to the point that the clamping tool grips the torch component firmly. This eliminates slip between the clamping tool and the torch component during the attachment or removal, thus allowing the torch component to be attached to, or removed from, the torch body with reliability. In addition, the torch component can be clamped by taking advantage of the rotary movement of the rotator while the torch component is being attached or removed. This eliminates the need for clamping the torch component by separately providing an additional drive source other than the drive source for driving the rotator in rotation. Consequently, a rotary changer with a simplified structure and a smaller size is provided at a reduced cost.

According to the fourth aspect of the present disclosure, as the interlocking member is allowed to move forward and the rotator is allowed to rotate with the contact tip, which is screwed on and coupled to the torch body, inserted into the hollow from its tip end first, the frontend of the interlocking member popping out into the through hole comes into contact with the flat surface of the contact tip. Thereafter, as the rotator is allowed to further rotate, the frontend of the interlocking member will get hooked on the flat surface of the contact tip. This allows the contact tip to be removed from the torch body by turning the contact tip on its center axis. On the other hand, as the interlocking member is allowed to move backward, the frontend of the interlocking member will retract into the communication hole and go out of contact with the projecting portion of the contact tip any longer. This allows the contact tip to drop downward and be disposed of.

According to the fifth aspect of the present disclosure, two portions of the rotator get hooked on two portions of the contact tip that are located symmetrically to each other with respect to the center axis thereof, thus allowing the contact tip to turn on its center axis. This facilitates the contact tip's rotation with its center axis aligned with the rotational axis of the rotator during the contact tip removal. Consequently, this allows for avoiding an unwanted situation where removal of the contact tip with the center axis of the contact tip misaligned with the rotational axis of the rotator does damage to a portion of the torch body attached to the contact tip.

According to the sixth aspect of the present disclosure, once the annular projection covers the communication hole, the interlocking member cannot move backward any longer. Thus, in turning the contact tip on its center axis, the frontend of the interlocking member can get hooked firmly on the flat surface of the contact tip. On the other hand, when the annular projection uncovers the communication hole, the interlocking member can move backward. Thus, retracting the frontend of the interlocking member into the communication hole brings the frontend of the interlocking member out of contact with the projecting portion of the contact tip. Consequently, the contact tip can drop to be disposed of.

According to the seventh aspect of the present disclosure, as the contact tip, removed from the torch body to bring its projecting portion into contact with the frontend of the interlocking member, is pressed downward, the projecting portion of the contact tip presses the frontend of the interlocking member downward. This allows the rotator to move down against the biasing force of the second biasing member and also allows the annular projection to reach a position to uncover the communication hole and the interlocking member to move backward. Next, as the contact tip is pressed further downward, the contact tip will move downward while allowing the projecting portion to make a sliding contact with the frontend of the interlocking member, thus causing the frontend of the interlocking member to retract into the communication hole. Consequently, the contact tip can drop downward to be disposed of. When the contact tip drops down, the biasing force of the first biasing member moves the interlocking member forward to make its rear end retract into the communication hole. As a result, while the annular projection is allowed to make a sliding contact with the outer peripheral surface of the rotator under the biasing force of the second biasing member, the rotator rises and gets ready for the next contact tip removal. As can be seen, simply pressing the removed used contact tip downward allows the contact tip to be disposed of Thus, used contact tip dumping can be carried out just by inserting the contact tip to be removed next into the hollow. Consequently, the contact tip removal can be carried out repeatedly and efficiently.

According to the eighth aspect of the present disclosure, the interlocking member is allowed to move forward using a simple structure, and therefore, the manufacturing cost can be cut down.

According to the ninth aspect of the present disclosure, preventing the O-ring from being disengaged from the interlocking member allows the biasing force of the O-ring to be conveyed to the interlocking member with reliability. Consequently, while the contact tip is being removed, the frontend of the interlocking member can get hooked on the flat surface of the contact tip as intended.

According to the tenth aspect of the present disclosure, as the used contact tip being held in the rotator by the projecting portion is pressed downward, the contact tip will move downward while keeping the projecting portion in sliding contact with the sloped surface of the frontend of the interlocking member. Thus, the contact tip receives decreased reactive force from the interlocking member along its center axis. Consequently, the load produced while the contact tip is being pressed downward decreases so much as to allow the contact tip to move downward smoothly.

According to the eleventh aspect of the present disclosure, the upward or downward movement of the rotator allows the interlocking member to move forward and the frontend thereof to get hooked on the flat surface of the contact tip. That is why there is no need to separately provide any additional drive source for sliding the interlocking member, thus cutting down the cost of the rotary changer. In addition, the pressing force applied by the frontend of the interlocking member against the flat surface of the contact tip increases the degree of close contact between the contact tip and the interlocking member, thus enhancing the degree of hooking between the contact tip and the interlocking member.

According to the twelfth aspect of the present disclosure, as the rotator is moved upward or downward with the rear end of the interlocking member popping out of the communication hole, the rear end of the interlocking member will come into a sliding contact with the second sloped surface, thus allowing the interlocking member to move forward. Consequently, the structure of the interlocking member working in conjunction with the upward or downward movement of the rotator is simplified and the cost of the rotary changer can be cut down.

According to the thirteenth aspect of the present disclosure, as the contact tip, attached to the torch body with the rear end of the interlocking member popping out of the communication hole, is inserted into the hollow of the rotator from over the rotary changer, the torch body will come into contact with a contact portion. Thus, downward force is applied to the rotator. Then, the rear end of the interlocking member makes a sliding contact with the second sloped surface, thus allowing the interlocking member to move forward. As a result, the front end of the interlocking member gets hooked on the flat surface of the contact tip with the annular projection facing the communication hole. Consequently, the contact tip is removable from the torch body by rotating the rotator. When the torch body is moved upward after the contact tip has been removed, the rotator will move upward under the biasing force of the third biasing member, thus making the annular projection uncover the communication hole and allowing the interlocking member to move backward. This allows the front end of the interlocking member to retract into the communication hole and the contact tip to drop and be disposed of.

According to the fourteenth aspect of the present disclosure, as the torch component, which is screwed on, and coupled to, the torch body, is allowed to screw off the torch body by rotating the rotator in the normal direction rotation direction, the rotator will gradually move in the direction away from the torch body against the biasing force of the fourth biasing member. This prevents screwing the torch component during the removal work from imposing excessive load onto either the rotator or the torch body to cause deformation or damage to the rotator or the torch body.

BRIEF DESCRIPTION OF THE DRAWINGS

FIG. 18 is a view corresponding to the cross-sectional view of FIG. 12 and illustrating a state where the contact tip used is on the verge of being disposed of.

FIG. 19 is a view corresponding to the cross-sectional view of FIG. 12 and illustrating a state where the contact tip used is being disposed of.

FIG. 21 is a view corresponding to the cross-sectional view of FIG. 12 and illustrating a state where the contact tip used has just been disposed of.

FIG. 28 is a view corresponding to the cross-sectional view of FIG. 22 and illustrating a state where the contact tip removed is being disposed of.

FIG. 35 is a view corresponding to the cross-sectional view of FIG. 30 and illustrating a state where the contact tip removed is being disposed of.

DETAILED DESCRIPTION

Embodiments of the present disclosure will now be described in detail with reference to the accompanying drawings. Note that the following description of embodiments is only an example in nature and is not intended to limit the scope, application, or uses of the present disclosure.

First Embodiment of the Present Disclosure

Figure 1:
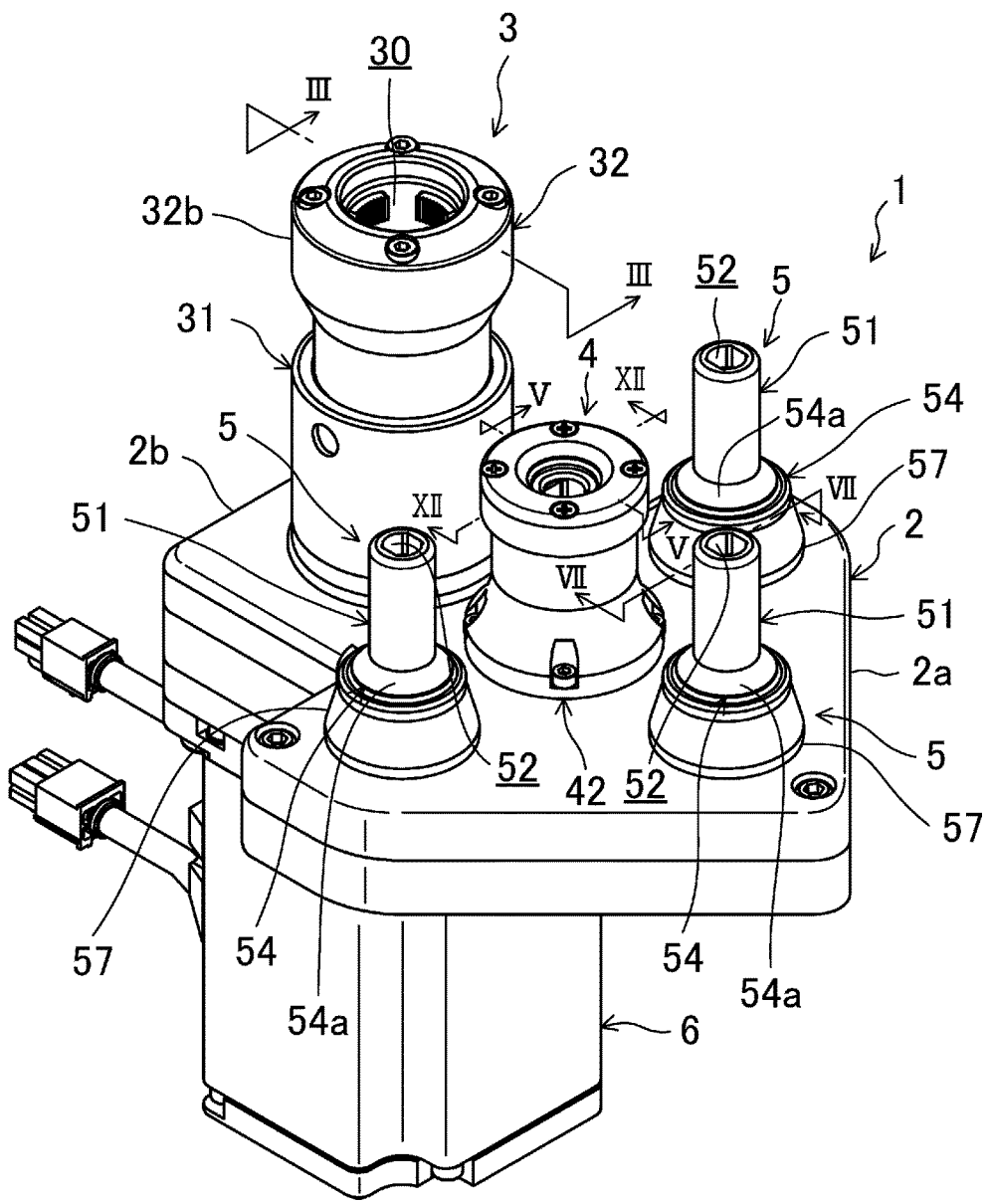
FIG. 1 is a perspective view illustrating a rotary changer according to a first embodiment of the present disclosure.

FIG. 1 illustrates a rotary changer 1 according to a first embodiment of the present disclosure. This rotary changer 1 is designed to automatically replace a metallic nozzle 11 or contact tip 12, which is an exemplary torch component of a welding torch 10 for use to weld a steel plate, for example, by arc welding (see FIGS. 8-21).

This welding torch 10 includes a circular columnar torch body 10a, and the nozzle 11 having a cylindrical shape is screwed on, and coupled to, a tip end portion of the torch body 10a so as to be readily attachable to, and removable from, the tip end portion.

The tip end portion of the nozzle 11 has a tapered shape, of which the diameter gradually decreases toward an opening at the tip end. Meanwhile, the outer peripheral surface at a base end of the nozzle 11 has a knurled engageable portion 11a extending in the circumferential direction.

That is to say, the engageable portion 11a has a large number of teeth and spaces which extend along the center axis of the nozzle 11 and which are arranged alternately around the center axis.

A copper contact tip 12 in a fine rod shape is screwed on, and coupled to, the tip end of the torch body 10a. The tip end portion of the contact tip 12 sticks out of the opening at the tip end of the nozzle 11.

As shown in FIGS. 10-19, a portion of the contact tip 12 covering a middle through the tip end of its outer peripheral surface has a tapered shape, of which the diameter gradually decreases toward the tip end of the contact tip 12. The outer peripheral surface of the contact tip 12 also has two flat surfaces 12b which are symmetric and parallel to each other with respect to the center axis and which are located closer to the base end.

Each of the flat surfaces 12b is formed by cutting off the outer peripheral surface of the contact tip 12. Thus, a portion of the contact tip 12 closer to the base end thereof than each flat surface 12b is serves as a projecting portion 12c projecting laterally outward. That is to say, the outer peripheral surface of the contact tip 12 includes the flat surfaces 12b and the projecting portions 12c, which are arranged in this order from the tip end.

As shown in FIG. 1, this rotary changer 1 includes a gearbox 2 having an arrow shape in a plan view and comprised of a thick, generally triangular plate portion 2a and a rectangular plate portion 2b continuous with the triangular plate portion 2a.

Figure 3:
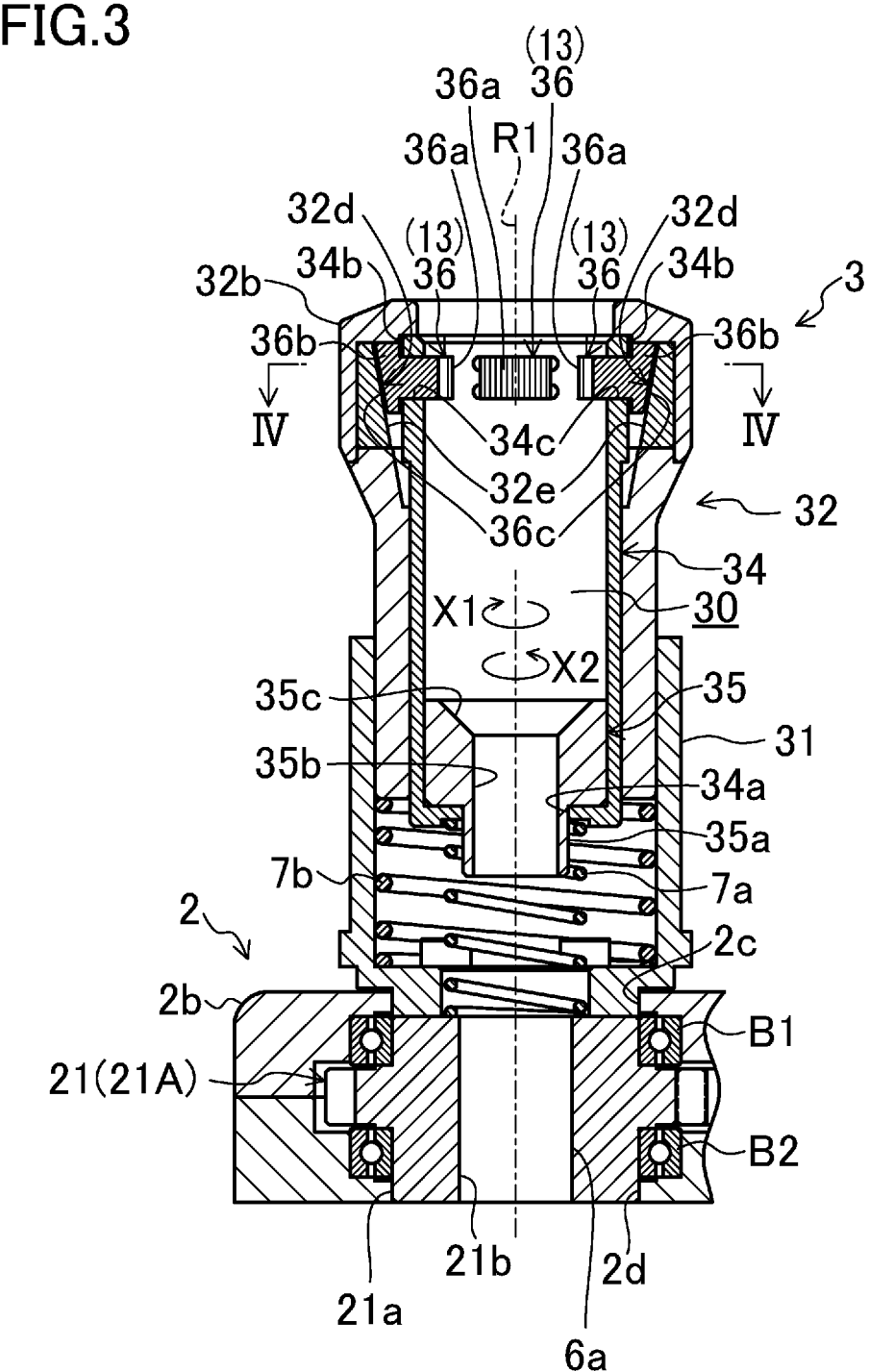
FIG. 3 is a cross-sectional view taken along the plane III-III shown in FIG. 1.

A servomotor 6 to run under servo control is attached onto the lower surface of the rectangular plate portion 2b of the gearbox 2. As shown in FIG. 3, an output shaft 6a of the servomotor 6 extends vertically and faces the inner space of the rectangular portion 2b of the gearbox 2.

The upper surface of the rectangular plate portion 2b, the upper surface of a part of the triangular plate portion 2a adjacent to the rectangular plate portion 2b, and the upper surface of the triangular plate portion 2a around the three corners thereof have upper through holes 2c with a circular cross section as shown in FIGS. 8-19. Meanwhile, the lower surface of the triangular plate portion 2a and the lower surface of the rectangular plate portion 2b have lower through holes 2d, each squarely facing an associated one of the upper through holes 2c and having a circular cross section.

A generally disklike gear 21 is arranged between each associated pair of the upper and lower through holes 2c and 2d. These gears 21 have the same shape.

Each gear 21 has a horizontally broad and vertically projecting pivot 21a at its center. The pivot 21a has a through hole 21b vertically penetrating the pivot 21a at the center thereof.

Each gear 21 has upper and lower end portions of the pivot 21a supported rotatably by the gearbox 2 via bearings B1 and B2, respectively.

Into the through hole 21b of the gear 21 located inside the rectangular plate portion 2b (hereinafter referred to as a "gear 21A"), fitted is the output shaft 6a of the servomotor 6.

Figure 2:
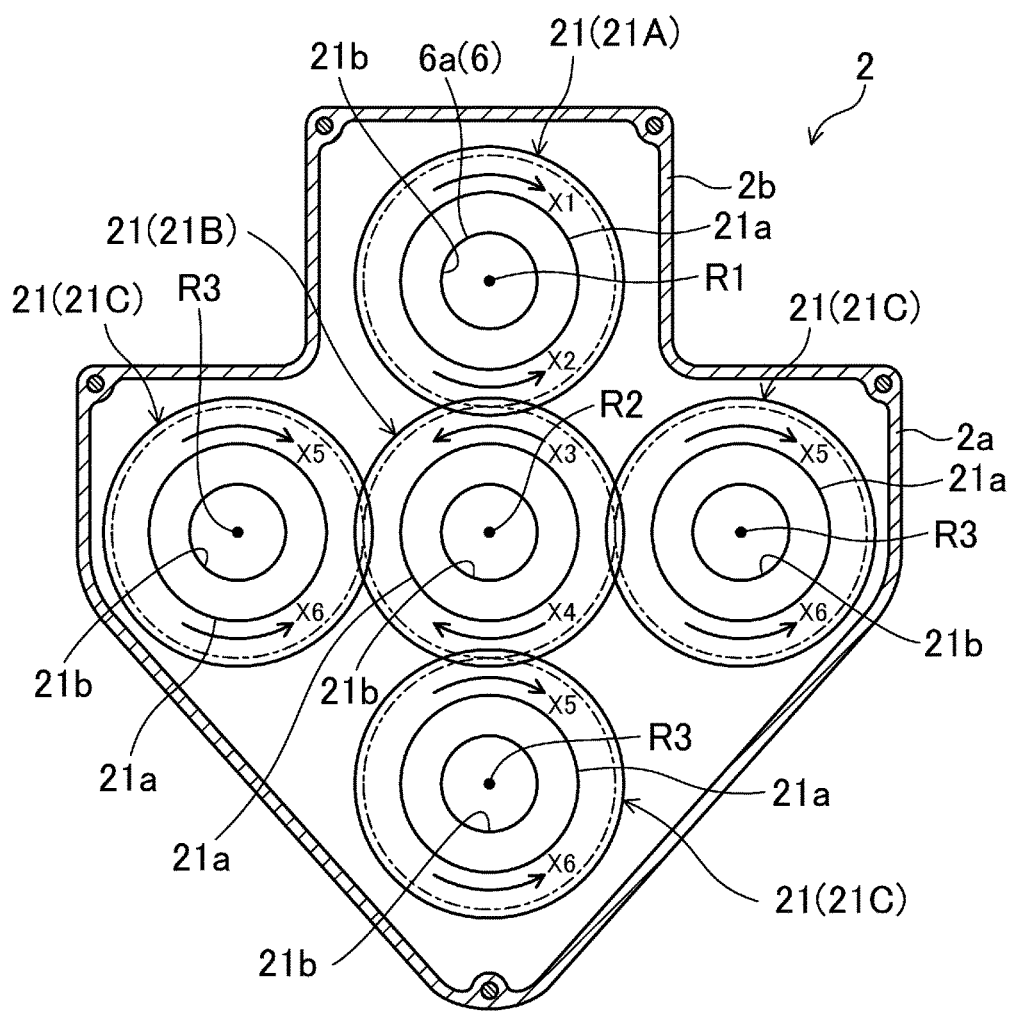
FIG. 2 is a plan view illustrating how respective gears mesh with each other inside a gearbox.

Also, the gear 21 located at that part of the triangular plate portion 2a of the gearbox 2 adjacent to the rectangular plate portion 2b (hereinafter referred to as a "gear 21B") meshes with not only the gear 21A in the rectangular plate portion 2b but also three gears 21 located close to the three corners of the triangular plate portion 2a (hereinafter referred to as "gears 21C") as shown in FIG. 2. Thus, turning the output shaft 6a of the servomotor 6 triggers rotation of the gear 21A in the rectangular plate portion 2b on the vertically extending rotational axis R1, rotation of the gear 21B on the vertically extending rotational axis R2, and rotation of the respective gears 21C on the vertically extending rotational axes R3.

A vertically extending nozzle replacement unit 3 is secured through the upper through hole 2c onto the upper surface of the gear 21A so as to rotate integrally with the gear 21A.

The nozzle replacement unit 3 includes a first cylindrical member 31 secured to the gear 21 such that its center axis extends vertically so as to be aligned with the rotational axis R1. The bottom opening of the first cylindrical member 31 is formed to be smaller than the top opening thereof.

Inside the first cylindrical member 31, fitted and inserted is a second cylindrical member 32 so as to be vertically slidable and have a center axis aligned with that of the first cylindrical member 31. The second cylindrical portion 32 includes, at the top thereof, an annular projection 32b projecting laterally outward and extending along the center axis.

Figure 4:
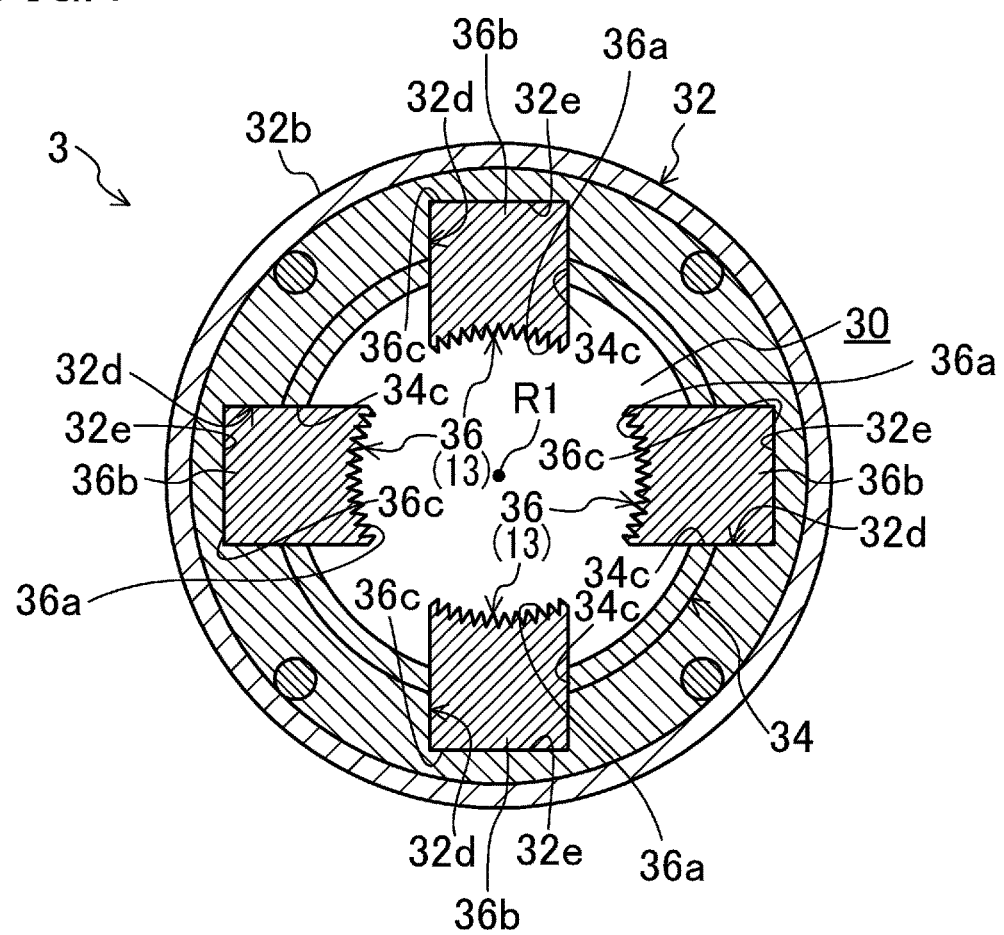
FIG. 4 is a cross-sectional view taken along the plane IV-IV shown in FIG. 3.

As shown in FIG. 4, inside the annular projection 32d, there are four recesses 32d, which are recessed laterally outward and arranged at regular intervals around the rotational axis R1. Also, as shown in FIG. 3, the bottom 32e of each recess 32d is sloped so as to gradually come closer toward the rotational axis R1 downwardly (i.e., in the other direction along the rotational axis R1).

Inside the second cylindrical member 32, fitted and inserted is a generally cylindrical, third cylindrical member 34 so as to be vertically slidable and have a center axis aligned with the rotational axis R1.

The third cylindrical member 34 has an upwardly open hollow 30, and also has a fitting hole 34a at the center of its bottom.

A pressable member 35 having a convex cross section is fitted inside the bottom of the third cylindrical member 34.

The pressable member 35 has a downwardly protruding fitting portion 35a at the center of its lower surface. The fitting portion 35a fits into the fitting hole 34a from over the hole 34a and pops out of the fitting hole 34a into the inner space of the first cylindrical member 31.

The pressable member 35 has a tip avoiding hole 35b penetrating vertically the member 35 along the center axis thereof. The top opening of the tip avoiding hole 35b has a tapered diameter-decreasing portion 35c, of which the diameter gradually decreases downward with decreasing distance from the rotational axis R1.

At the top of the third cylindrical member 34, four protrusions 34b are provided at respective positions facing the recesses 32d so as to protrude laterally outward. These protrusions 34b are provided to get hooked on the peripheral edge at the top opening of each recess 32d when the third cylindrical member 34 slides upward to reach the protrusions 34b and to keep the third cylindrical member 34 from sliding further upward.

The third cylindrical member 34 also has guide holes 34c, which have been cut through the peripheral wall of the third cylindrical member 34 toward the rotational axis R1 and which are located under the respective protrusions 34b.

A moving block 36 (serving as an exemplary interlocking member) is fitted and inserted into each of the guide holes 34c such that each guide hole 34c guides the movement of its associated moving block 36 in a direction intersecting with the rotational axis R1.

That is to say, the movement blocks 36 are allowed to move forward and backward in the direction intersecting with the rotational axis R1.

Each of these movement blocks 36 has an engaging portion 36a engageable with the engageable portion 11a of the nozzle 11 and facing the rotational axis R1. The engaging portion 36a includes spaces and teeth meshing with their corresponding teeth and spaces of the engageable portion 11a and alternately arranged to form an arced pattern.

On the other side of each moving block 36 opposite from the rotational axis R1, the moving block 36 has an expanded portion 36b having a vertically greater size than any other portion thereof.

The expanded portion 36b has a slidable surface 36c sloping downward with decreasing distance from the rotational axis R1. The slidable surface 36c contacts slidably with the bottom 32e of its associated recess 32d.

Inside the first cylindrical member 31, arranged are a first coil spring 7a and a second coil spring 7b, of which the spring center axes extend vertically. The first coil spring 7a is located inside the second coil spring 7b such that their spring center axes are aligned with each other.

An upper portion of the first coil spring 7a is externally fitted onto the fitting portion 35a. On the other hand, a lower portion of the first coil spring 7a is not only inserted into the bottom opening of the first cylindrical member 31 but also abuts with the peripheral edge of the top opening of the through hole 21b of the gear 21A, thus biasing the third cylindrical member 34 upward.

An upper portion of the second coil spring 7b abuts with the bottom of the second cylindrical member 32. On the other hand, a lower portion of the second coil spring 7b abuts downward with the peripheral edge of the bottom opening of the first cylindrical member 31, thus biasing the second cylindrical member 32 upward.

Figure 8:
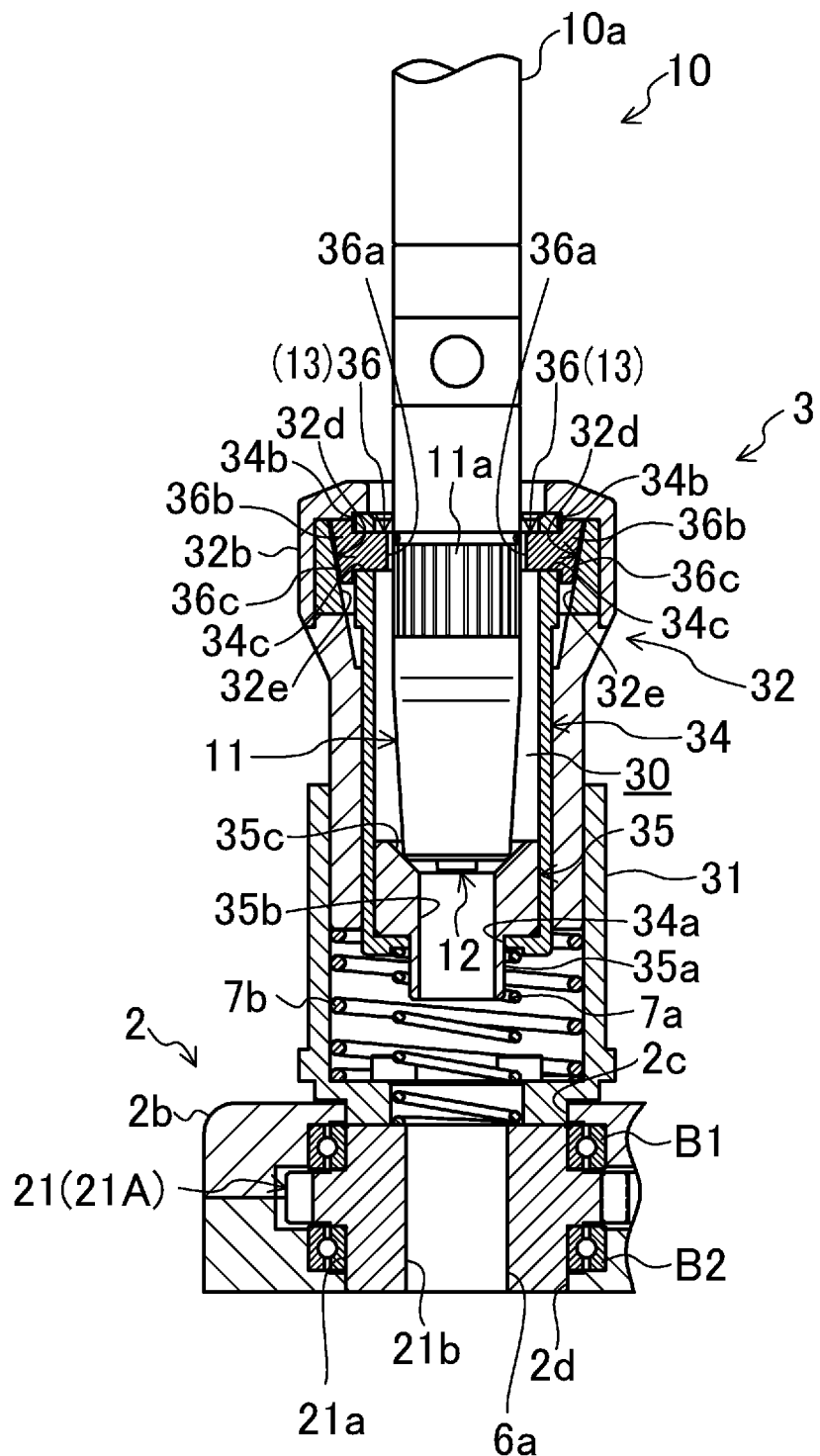
FIG. 8 is a view corresponding to the cross-sectional view of FIG. 3 and illustrating either a state where a nozzle is on the verge of being removed from the tip end portion of a torch body or a state where the nozzle has just been attached to the tip end portion of the torch body.
Figure 9:
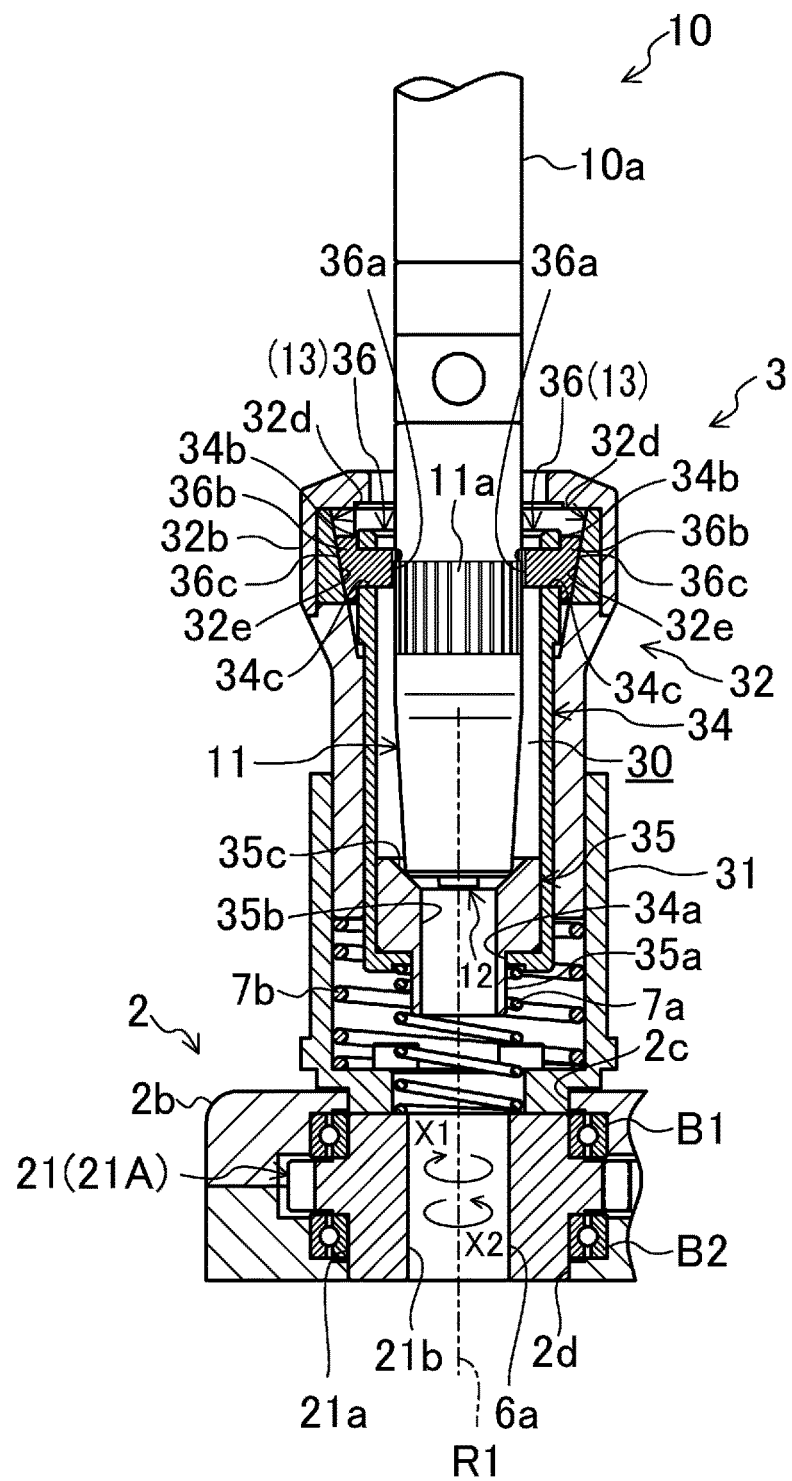
FIG. 9 is a view corresponding to the cross-sectional view of FIG. 3 and illustrating either a state where the nozzle is being removed from the tip end portion of the torch body or a state where the nozzle is being attached to the tip end portion of the torch body.

Then, as shown in FIGS. 8 and 9, the welding torch 10 is inserted from over the nozzle replacement unit 3 into the hollow 30 thereof with its center axis aligned with the rotational axis R1 and then moved downward along the rotational axis R1. This allows the tip end portion of the contact tip 12 to be inserted into the tip avoiding hole 35b of the pressable member 35 and also brings a tip end portion of the nozzle 11 into contact with the decreasing-diameter portion 35c. Thus, the pressable member 35 is pressed downward by the welding torch 10.

As the pressable member 35 is thus pressed downward by the welding torch 10, the third cylindrical member 34 will slide downward with respect to the second cylindrical member 32 against the biasing force of the first coil spring 7a.

The bottom 32e of each recess 32d of the second cylindrical member 32 makes a sliding contact with the slidable surface 36c of an associated moving block 36 that moves downward along with the third cylindrical member 34 sliding downward with respect to the second cylindrical member 32, thereby pressing the moving block 36 toward the rotational axis R1. The respective moving blocks 36 thus pressed are guided by the respective guide holes 34c to move forward toward the rotational axis R1.

In other words, the respective recesses 32d are configured to allow their associated moving blocks 36 to move forward toward the rotational axis R1 as the third cylindrical member 34 slides downward.

In addition, the respective moving blocks 36 form the positioning member 13 according to the present disclosure. The forward movement of the respective moving blocks 36 toward the rotational axis R1 brings the engageable portion 11a into engagement with the respective engaging portions 36a. This allows the respective moving blocks 36 to get interlocked with the outer peripheral surface of the nozzle 11, and also brings the center axis of the nozzle 11 into alignment with the rotational axis R1, or at least makes the former proximate to the latter.

As the pressable member 35 is pressed further downward by the welding torch 10 with the engageable portion 11a engaged with the respective engaging portions 36a, the third and second cylindrical members 34 and 32 will slide integrally downward with respect to the first cylindrical member 31 against the biasing forces of the first and second coil springs 7a and 7b.

Figure 10:
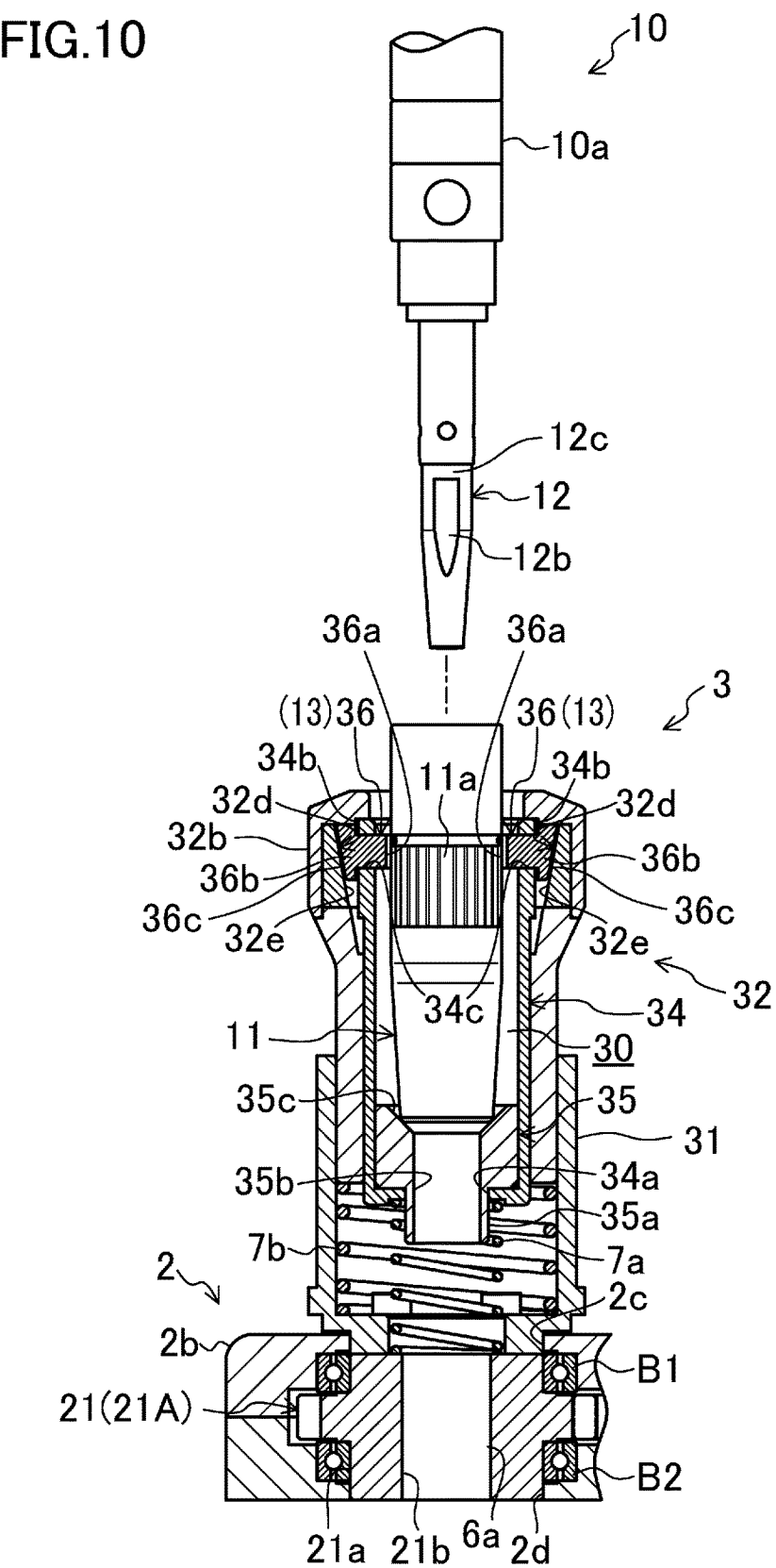
FIG. 10 is a view corresponding to the cross-sectional view of FIG. 3 and illustrating either a state where the nozzle has just been removed from the tip end portion of the torch body or a state where the nozzle is on the verge of being attached to the tip end portion of the torch body.

Then, the nozzle replacement unit 3 rotates in the direction X1 around the rotational axis R1 as shown in FIG. 10 with the respective moving blocks 36 interlocked with the nozzle 11, thereby turning the nozzle 11 on its center axis and removing the nozzle 11 from the tip end portion of the torch body 10a.

On the other hand, to screw and couple the nozzle 11 onto the tip end portion of the torch body 10a, the nozzle 11 may be turned on its center axis in the following manner. Specifically, the third cylindrical member 34 may be allowed to slide downward with respect to the second cylindrical member 32 with pressure applied downward from the torch body 10a to the nozzle 11 already set in place in the hollow 30. In the meantime, the nozzle replacement unit 3 may be rotated in the direction X2 around its rotational axis R1 with the respective moving blocks 36 moved toward the rotational axis R1 to bring the engageable portion 11a of the nozzle 11 into engagement with the engaging portions 36a of the respective moving blocks 36.

A vertically extending removal unit 4 is secured through an upper through hole 2c to the upper surface of the gear 21B as shown in FIG. 1 so as to rotate integrally with the gear 21B.

Figure 5:
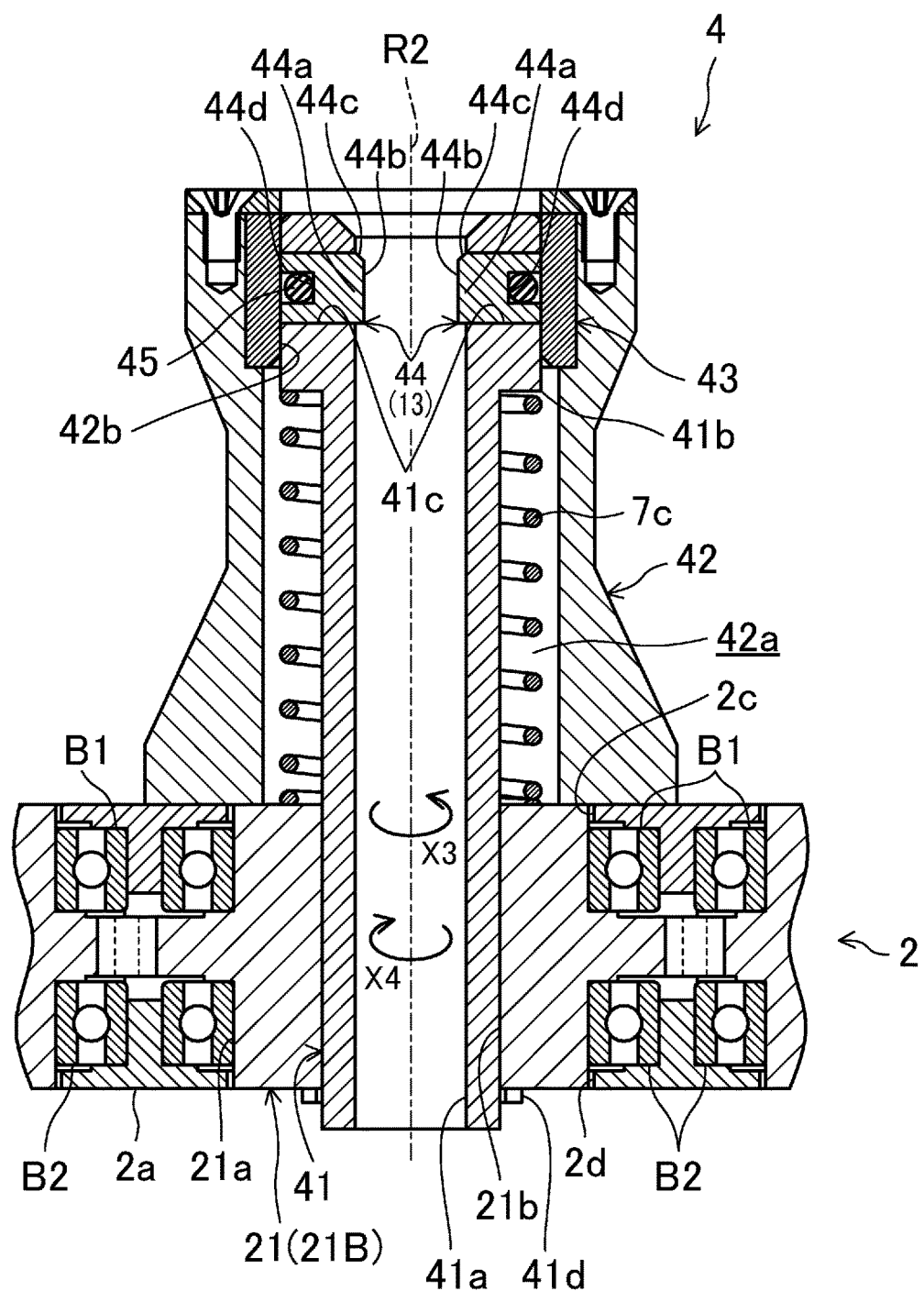
FIG. 5 is a cross-sectional view taken along the plane V-V shown in FIG. 1.

A cylindrical first rotator 41 with a vertically extending rotational axis R2 is inserted and fitted as shown in FIG. 5 into the through hole 21b of the gear 21B so as to be slidable vertically (i.e., in two directions along the rotational axis R2).

The first rotator 41 is configured to rotate, integrally with the gear 21B, on the rotational axis R2 via a key groove (not shown). As the output shaft 6a of the servomotor 6 turns in one direction, the first rotator 41 rotates in the direction X3 around the rotational axis R1 via the gears 21A and 21B. On the other hand, as the output shaft 6a of the servomotor 6 turns in the other direction, the first rotator 41 rotates in the direction X4 around the rotational axis R1 via the gears 21A and 21B.

The first rotator 41 has a vertically penetrating through hole 41a (serving as an exemplary hollow), through which the contact tip 12 is passable with its tip end facing downward, and of which the center axis is aligned with the rotational axis R2. The peripheral wall portion at the top of the first rotator 41 is a thickened portion 41b, of which the outer peripheral portion projects laterally outward with respect to the other portion and which is thicker than the other portions.

The thickened portion 41b has a pair of communication holes 41c, which are arranged symmetrically to each other with respect to the rotational axis R2 and which extend horizontally toward the rotational axis R2 and communicate with the through hole 41a. The opening of each of these communication holes 41c facing toward the through hole 41a is smaller in diameter than the other opening thereof facing away from the through hole 41a.

Figure 6:
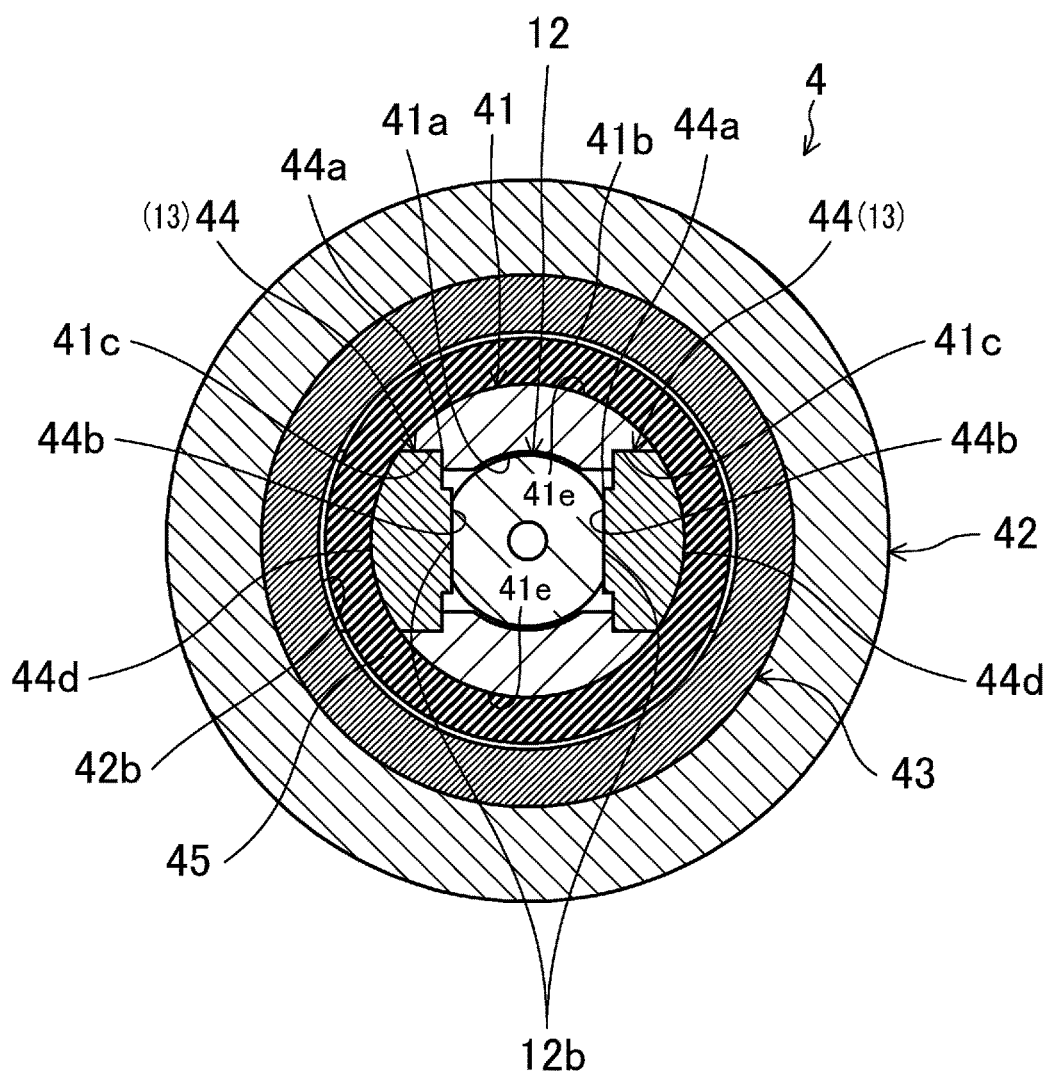
FIG. 6 is a cross-sectional view taken along the plane VI-VI shown in FIG. 13.

The outer peripheral surface of the thickened portion 41b has a pair of first recessed grooves 41e, which are arranged symmetrically to each other with respect to the rotational axis R2 and which extend around the rotational axis R2 to communicate with the two communication holes 41c as shown in FIG. 6.

As shown in FIG. 5, a ringlike stopper member 41d is fitted onto the outer peripheral surface of a portion of the first rotator 41 near the bottom thereof. As the first rotator 41 slides upward, the stopper member 41d comes into contact with the peripheral edge of the lower opening of the through hole 21b, thus keeping the first rotator 41 from upwardly sliding any farther.

Also, over the gear 21B, arranged is a cylindrical housing case 42, which has openings at the top and bottom and which has an internal space 42a that houses the first rotator 41 so as to allow the first rotator 41 to move upward or downward. A vertically middle portion of the outer periphery of the housing case 42 has an inwardly depressed shape with respect to the rest of the outer periphery.

A slide bearing 43 in a short cylindrical shape is fitted into a top portion of the housing case 42. The inner peripheral surface of the slide bearing 43 makes a sliding contact with the outer peripheral surface of the thickened portion 41b of the first rotator 41.

That is to say, inside the top portion of the inner space 42a, a vertically expanded annular projection 42b, protruding toward the rotational axis R2, is formed by the slide bearing 43. As the first rotator 41 rotates or is moved upward or downward, the protruding end facet of the annular projection 42b makes a sliding contact with the outer peripheral surface of the thickened portion 41b.

Each of the communication holes 41c of the first rotator 41 is provided with an interlocking member 44, which can move forward and backward in the communication direction thereof.

The interlocking member 44 has a block shape. The interlocking member 44 has, at a center portion thereof facing the through hole 41a (i.e., at the frontend thereof), a protruding portion 44a slightly popping out toward the through hole 41a. The protruding end of the protruding portion 44a is a vertically extending flat hooking surface 44b.

At the top of the hooking surface 44b, there is a first sloped surface 44c, which gradually slopes downward with decreasing distance from the rotational axis R2 of the first rotator 41.

On the other side of each interlocking member 44 opposite from the through hole 41a (i.e., at the rear end), there is a second recessed groove 44d extending around the rotational axis R2 of the first rotator 41 as shown in FIG. 6.

The second recessed grooves 44d of the interlocking members 44 are arranged to be connected to their associated first recessed grooves 41e of the first rotator 41. The two first recessed grooves 41e and the two second recessed grooves 44d are arranged to form a ring in a plan view.

Advancing the interlocking members 44 toward the through hole 41a allows a portion of each of the interlocking members 44 continuous with a base end of the protruding portion 44a to abut with the peripheral edge of the opening of the communication hole 41c closer to the through hole 41a. This keeps the interlocking member 44 from sliding toward the through hole 41a any farther and allows the protruding portion 44a to pop out into the through hole 41a.

Popping of the protruding portions 44a into the through hole 41a will bring the hooking surfaces 44b into contact and engagement with the flat surfaces 12b of the contact tip 12 being inserted into the through hole 41a, thus allowing the hooking surfaces 44b to get hooked on the flat surfaces 12b. In the meantime, the rear end of each of the interlocking members 44 retracts into the communication hole 41c.

That is to say, the interlocking members 44 form the positioning member 13 of the present disclosure, bringing the center axis of the contact tip 12 into alignment with, or making the center axis proximate to, the rotational axis R2.

On the other hand, the backward movement of the interlocking members 44 makes the protruding portions 44a retract into the communication holes 41c, thus allowing the contact tip 12 to pass through the through hole 41a. In the meantime, the rear end of each interlocking member 44 pops out into the gap between the housing case 42 and the first rotator 41.

An O-ring 45 of rubber (serving as an exemplary first biasing member) extending annularly around the rotational axis R2 of the first rotator 41 is fitted into the two first recessed grooves 41e and the two second recessed grooves 44d.

The O-ring 45 comes into contact with the other end of each interlocking member 44 and biases the interlocking members 44 toward the through hole 41a so as to allow the protruding portions 44a to pop out into the through hole 41a.

A third coil spring 7c (serving as an exemplary second biasing member) is externally fitted onto a portion of the first rotator 41 covering a middle toward the bottom thereof.

The top of the third coil spring 7c abuts with the thickened portion 41b. On the other hand, the bottom of the third coil spring 7c abuts with the peripheral edge of the top opening of the through hole 21b of the gear 21B, thus biasing the first rotator 41 upward such that the slide bearing 43 faces the communication holes 41c into which the respective rear ends of the interlocking members 44 have retracted.

Figure 11:
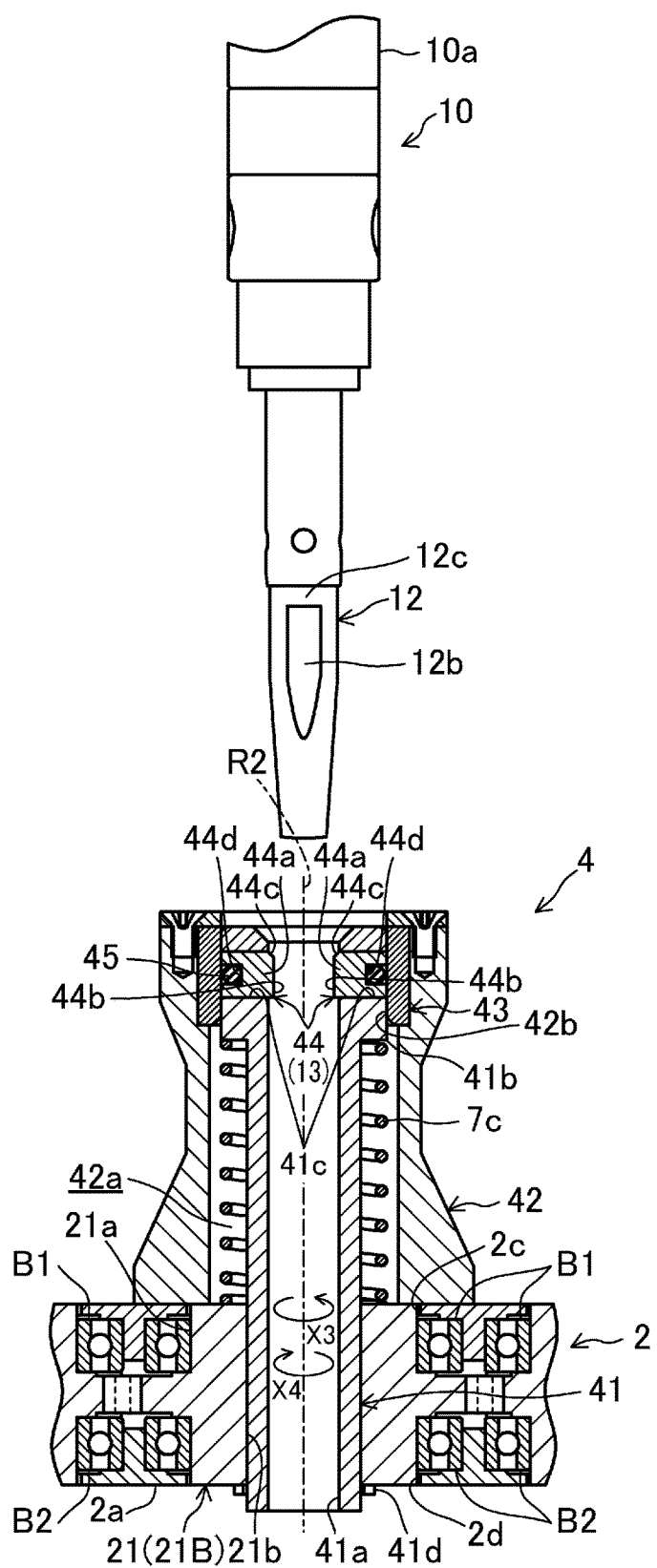
FIG. 11 is a view corresponding to the cross-sectional view of FIG. 5 and illustrating a state in a preparatory stage to make the contact tip ready to be removed from the tip end of the torch body.
Figure 12:
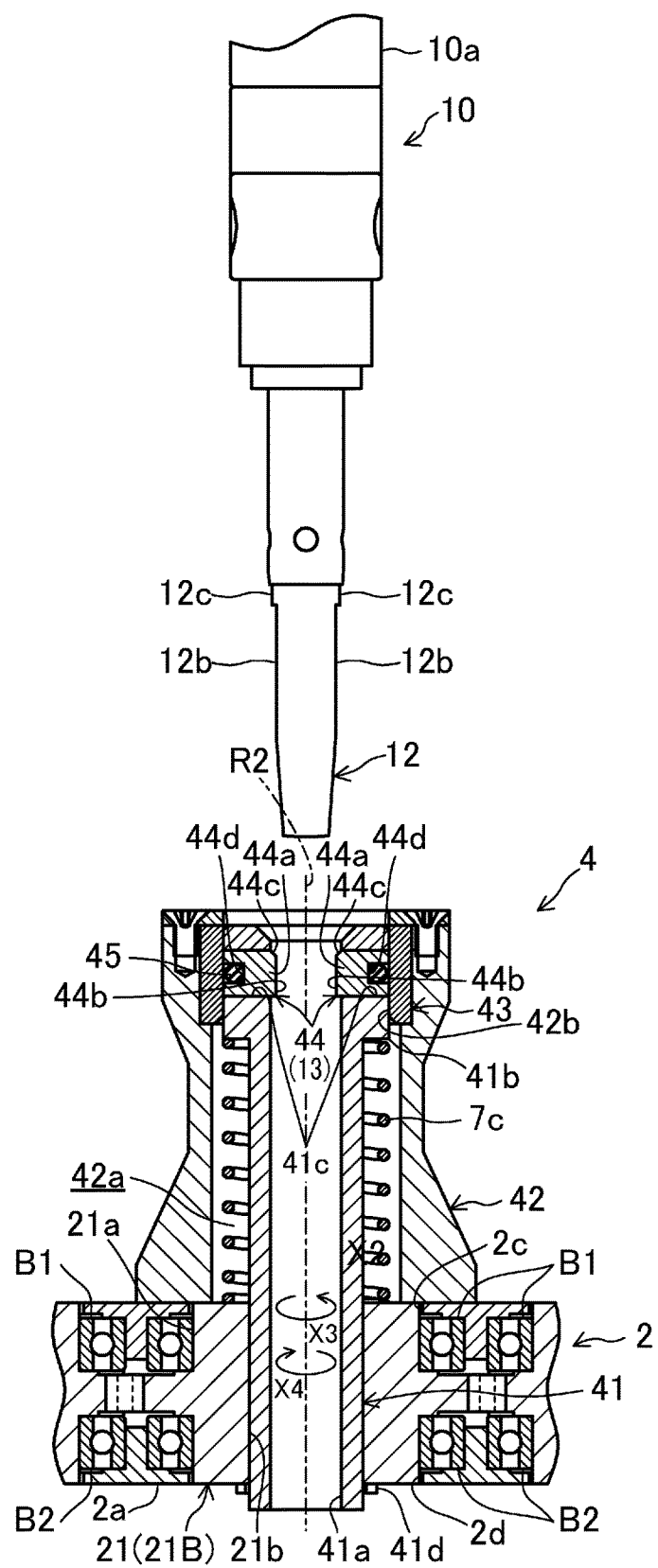
FIG. 12 is a cross-sectional view taken along the plane XII-XII shown in FIG. 1 and illustrating a state, following the one shown in FIG. 11, where a rotator in a removal unit has been turned 45 degrees on its rotational axis.
Figure 13:
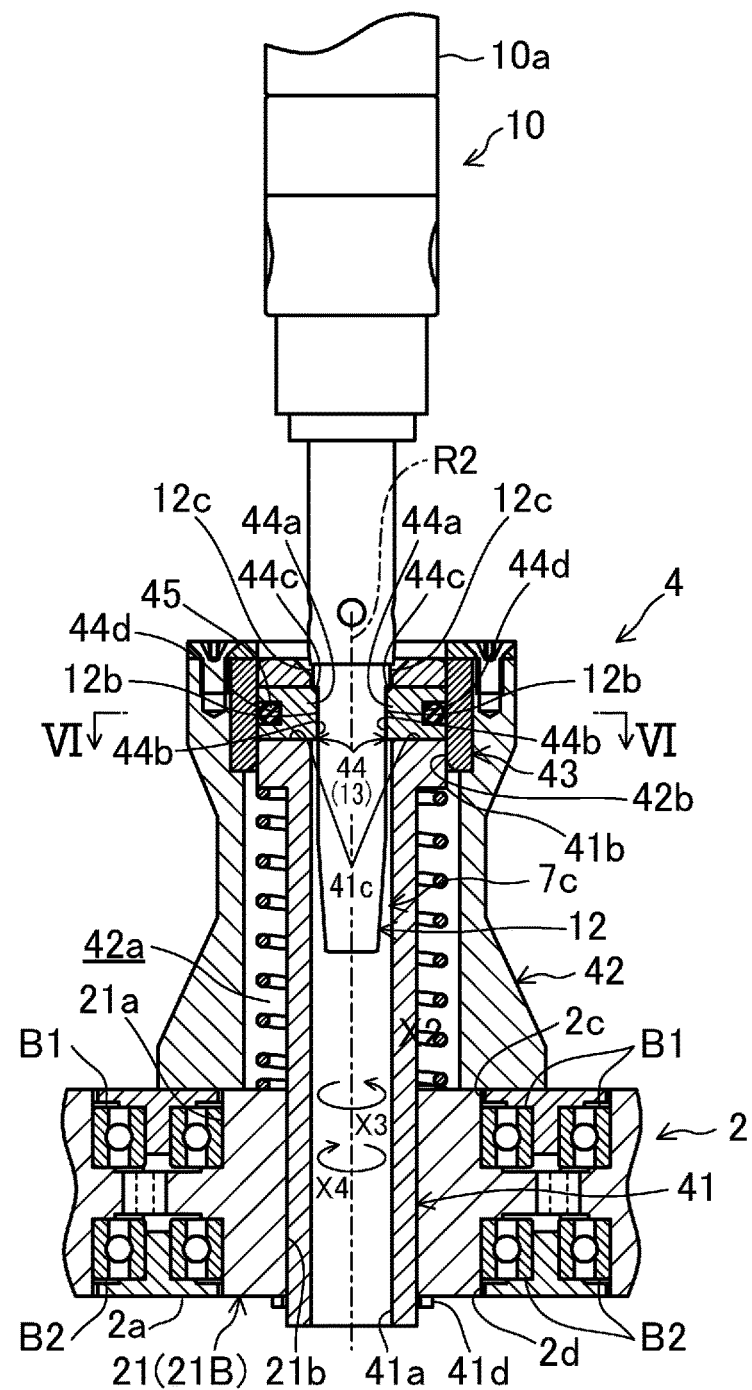
FIG. 13 is a view corresponding to the cross-sectional view of FIG. 12 and illustrating a state where the contact tip has just been inserted into the rotator inside the removal unit.

Then, as shown in FIGS. 11-13, the contact tip 12 is inserted into the through hole 41a from over the removal unit 4 such that its tip end faces downward and the first rotator 41 is allowed to rotate. Then, the respective hooking surfaces 44b of the interlocking members 44 will come into contact with the respective flat surfaces 12b of the contact tip 12.

Figure 14:
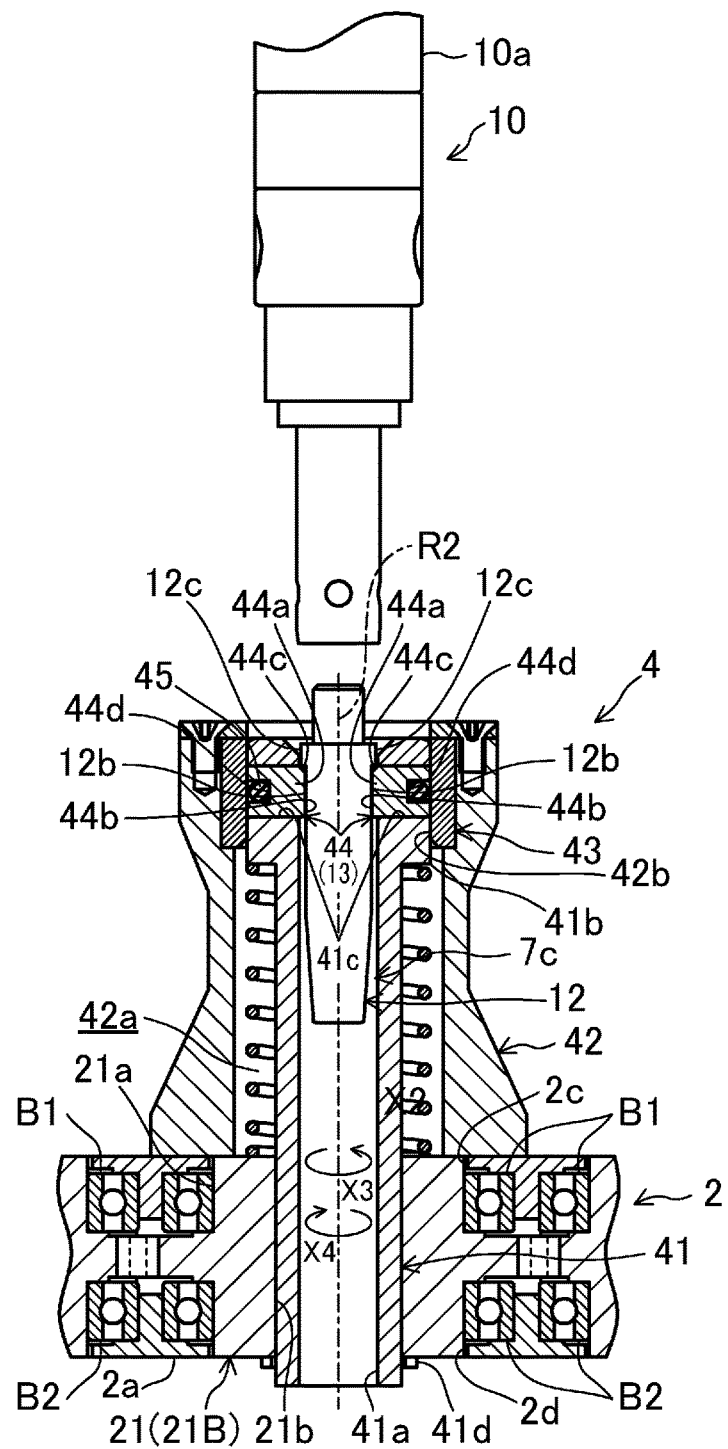
FIG. 14 is a view corresponding to the cross-sectional view of FIG. 12 and illustrating a state where the contact tip has just been removed from the tip end of the torch body.

As the first rotator 41 is allowed to further rotate, the contact tip 12 turns on its center axis with the respective hooking surfaces 44b of the interlocking members 44 hooked on the respective flat surfaces 12b of the contact tip 12 that has been inserted into the through hole 41a as shown in FIG. 14. Thus, the contact tip 12 is removed from the torch body 10a.

Figure 18:
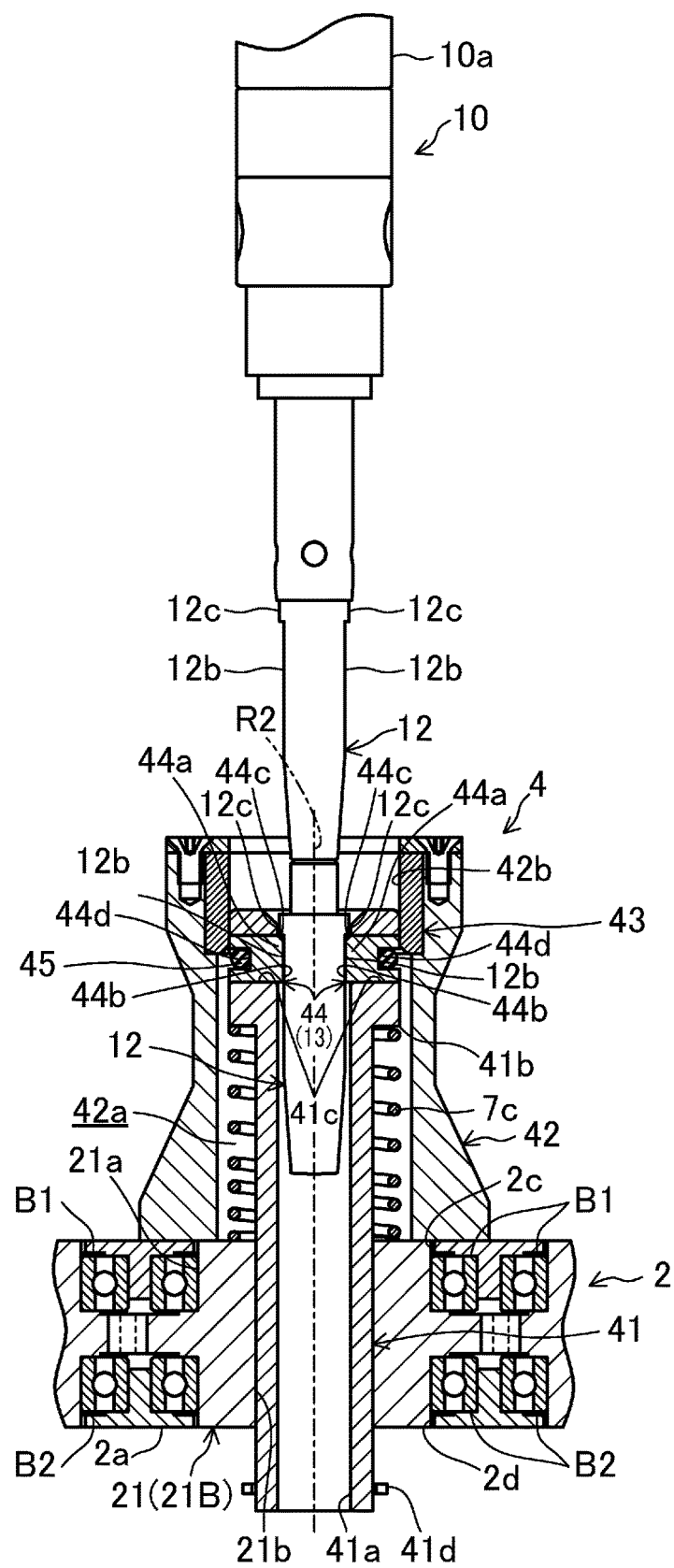

Also, downward pressure is applied to the used contact tip 12 removed from the torch body 10a and held in the removal unit 4 by having had its projecting portions 12c brought into contact with the protruding portions 44a of the respective interlocking members 44 from over the removal unit 4. Then, as shown in FIG. 18, the first rotator 41 will move downward against the biasing force of the third coil spring 7c to the point that the communication holes 41c do not face the slide bearing 43 anymore.

That is to say, the annular projection 42b (i.e., the slide bearing 43) is switched from the state of covering the respective communication holes 41c to the state of uncovering the communication holes 41c by the downward movement of the first rotator 41.

Figure 19:
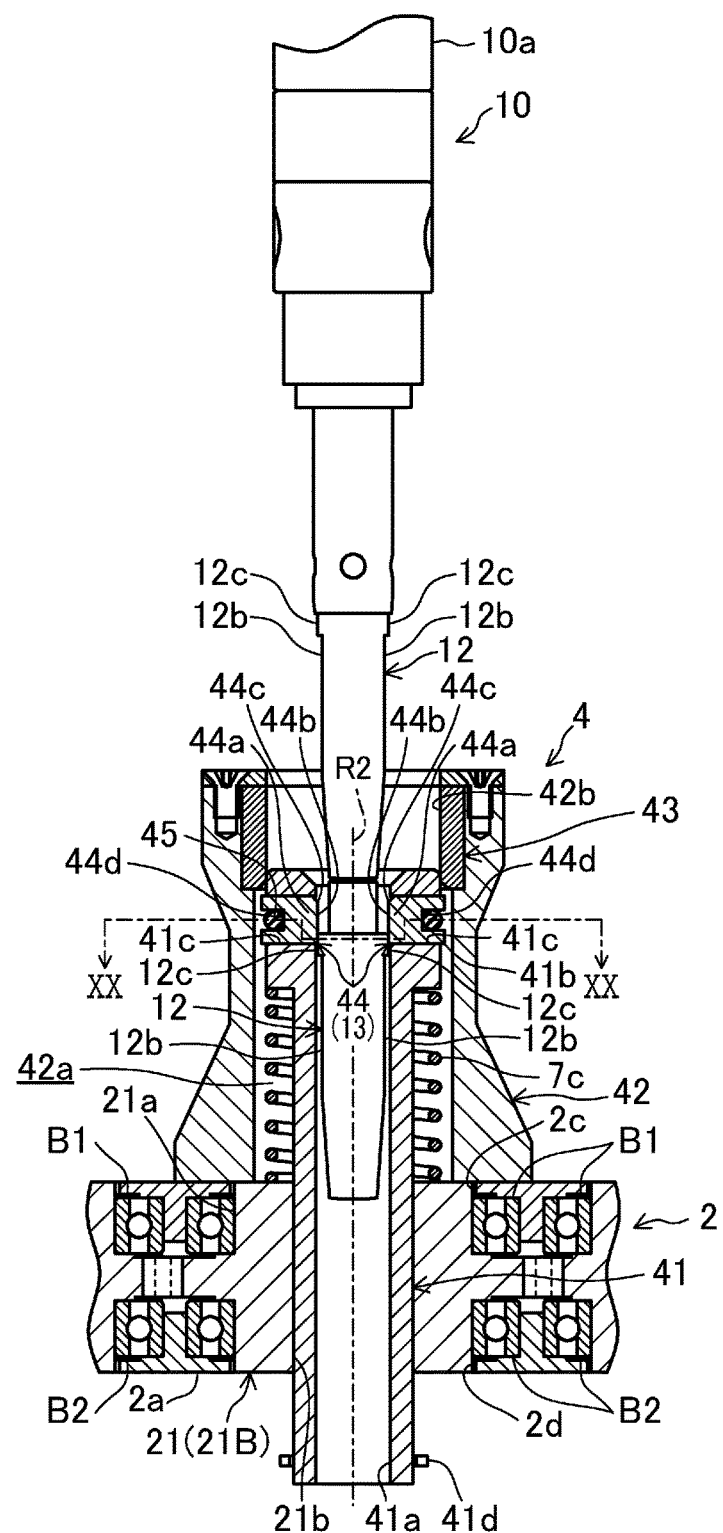
Figure 20:
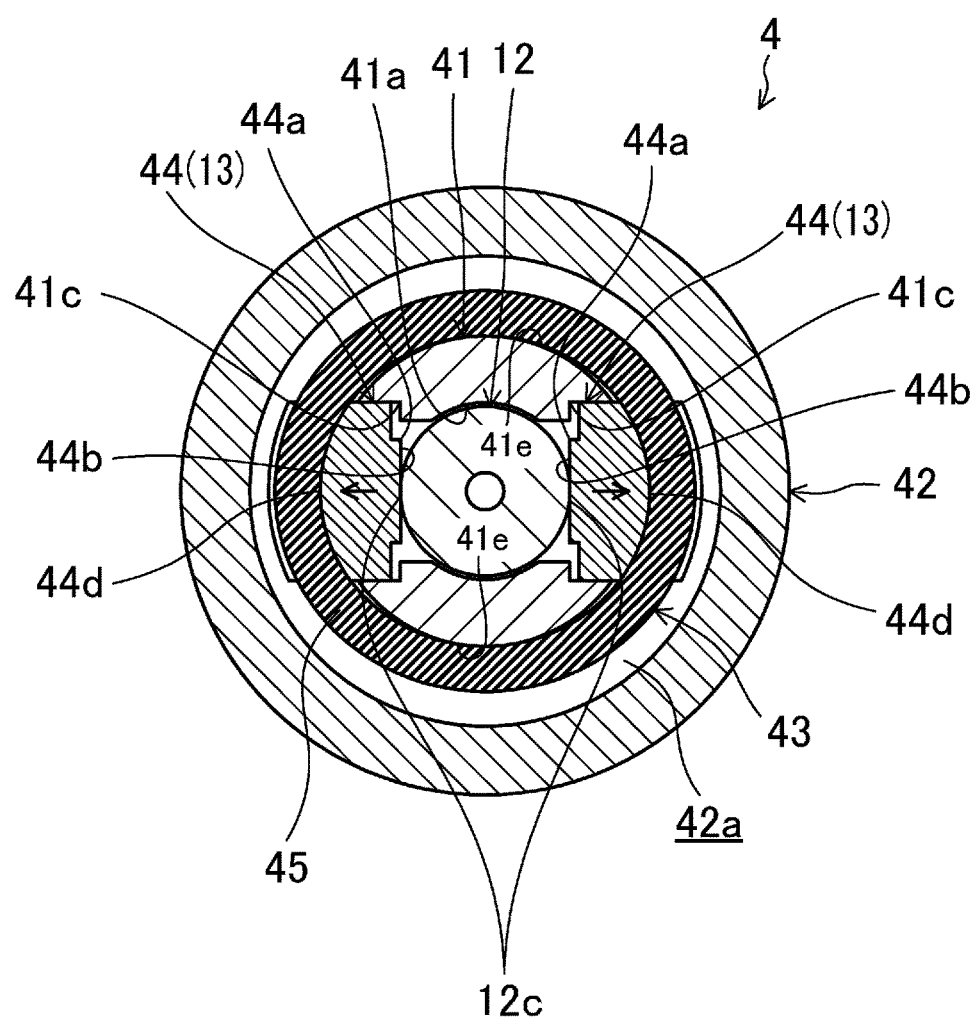
FIG. 20 is a cross-sectional view taken along the plane XX-XX shown in FIG. 19.

Furthermore, the downward pressure applied to the used contact tip 12 allows the projecting portions 12c of the contact tip 12 to press the respective interlocking members 44 in the direction away from the through hole 41a against the biasing force of the O-ring 45 while making a sliding contact with the protruding portions 44a of the interlocking members 44 as shown in FIGS. 19 and 20.

Figure 21:
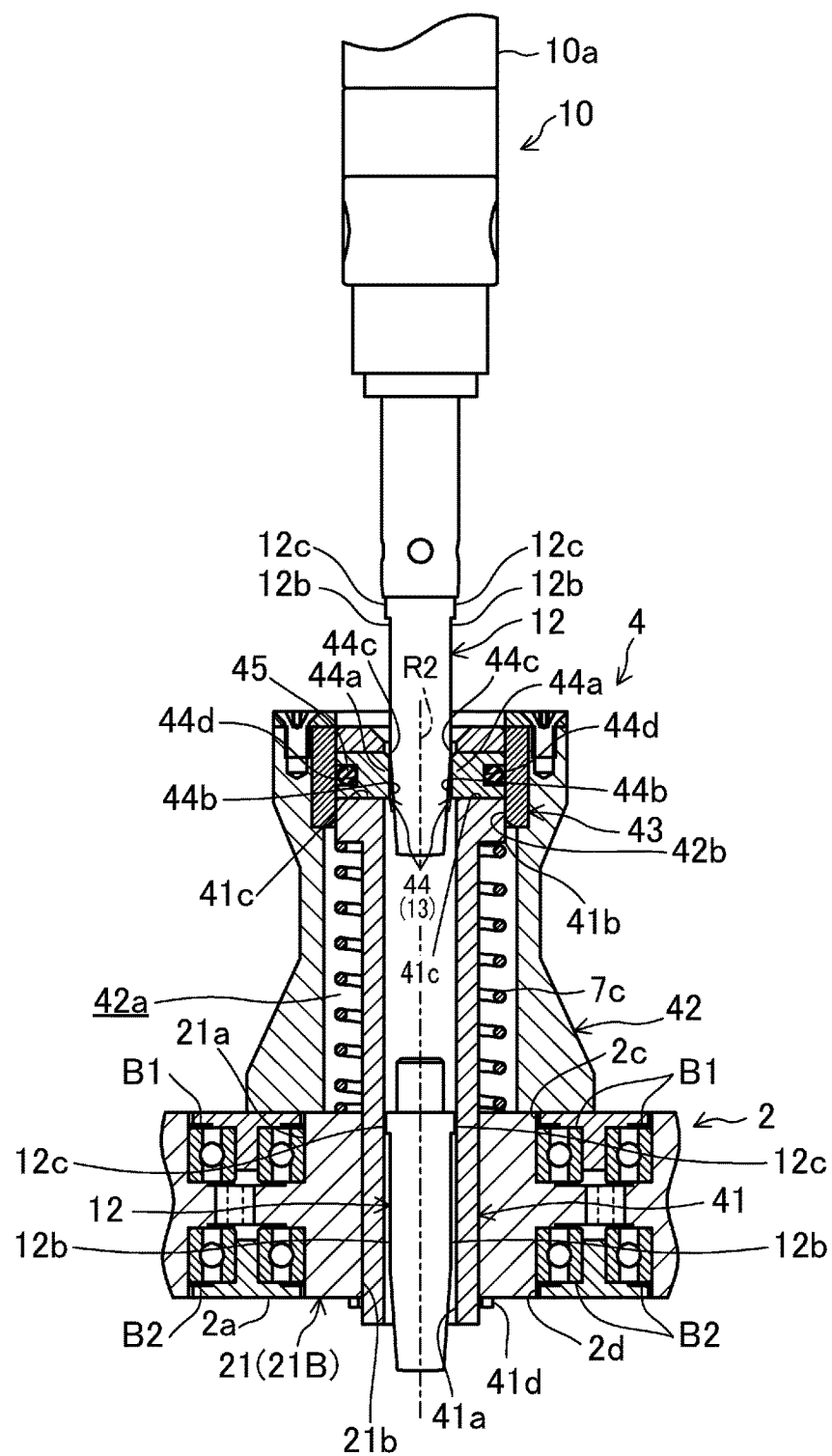

Then, the backward movement of the respective interlocking members 44 makes the protruding portions 44a of the interlocking members 44 retract into the communication holes 41c, thus allowing the used contact tip 12 to drop through the through hole 41a and be disposed of as shown in FIG. 21. This also allows the respective interlocking members 44 to move forward toward the through hole 41a again under the biasing force of the O-ring 45.

Also, as the interlocking members 44 move forward toward the through hole 41a, the rear end of each interlocking member 44 retracts into the communication hole 41c, thus bringing the interlocking members 44 out of contact with the slide bearing 43, even if the first rotator 41 slides upward. Thus, the first rotator 41 rises to its original position under the biasing force of the third coil spring 7c and the communication holes 41c reach the position where the holes 41c face the slide bearing 43.

That is to say, the annular projection 42b (i.e., the slide bearing 43) is switched from the state of uncovering the respective communication holes 41c to the state of covering the communication holes 41c by the upward movement of the first rotator 41.

As shown in FIG. 1, a vertically extending attachment unit 5 is secured to the upper surface of each gear 21C so as to rotate integrally with the gear 21C.

Figure 7:
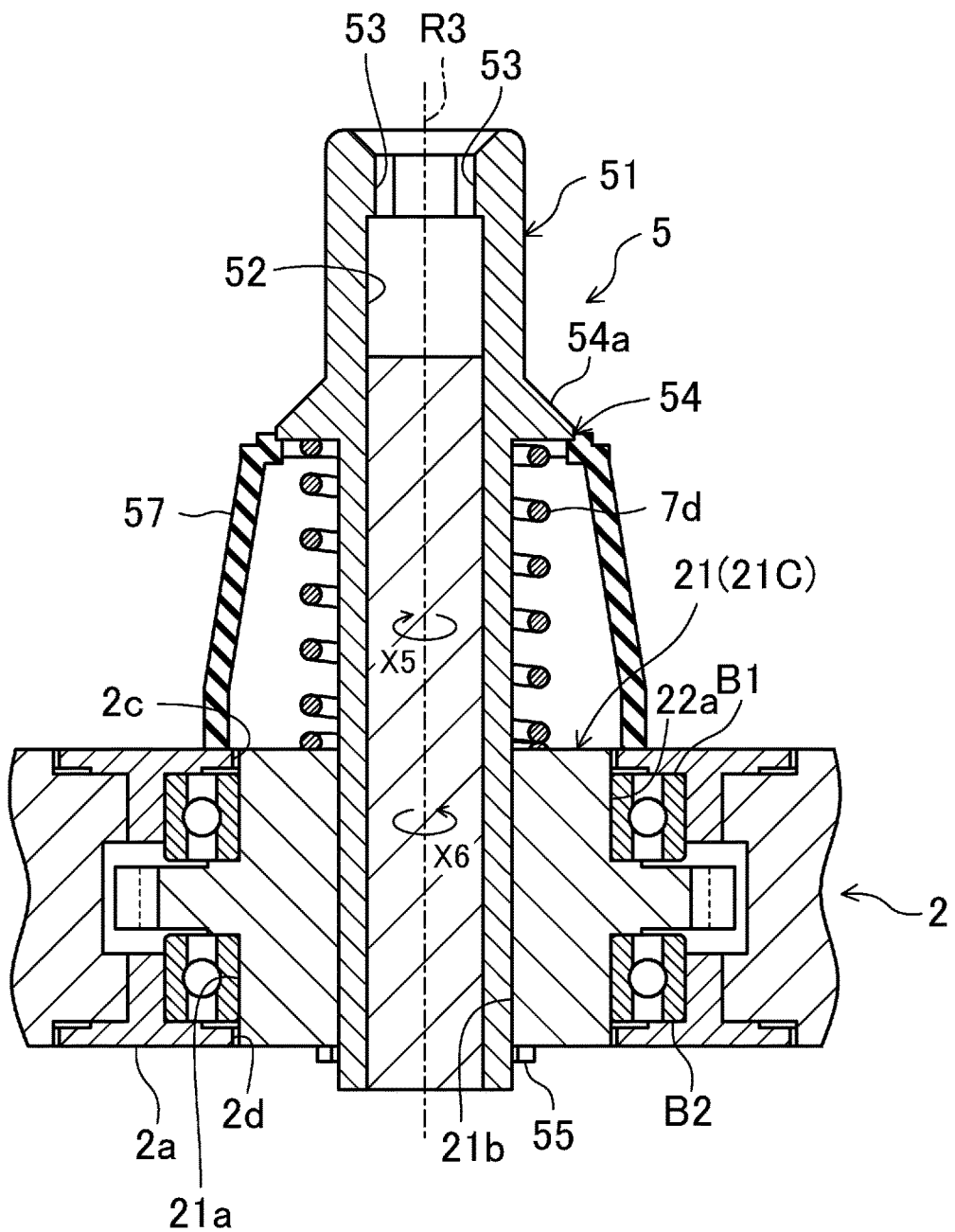
FIG. 7 is a cross-sectional view taken along the plane VII-VII shown in FIG. 1.

A generally bar-shaped second rotator 51 with a vertically extending rotational axis R3 is inserted as shown in FIG. 7 into the through hole 21b of each gear 21C so as to be slidable vertically (i.e., along the rotational axis R3).

The second rotator 51 is rotatable on the rotational axis R3 integrally with the gear 21C via a key groove (not shown). Turning the output shaft 6a of the servomotor 6 in one direction will make the second rotator 51 rotate in the direction X5 around the rotational axis R3 via the gears 21A, 21B, and 21C. Meanwhile, turning the output shaft 6a of the servomotor 6 in the other direction will make the second rotator 51 rotate in the direction X6 around the rotational axis R3 via the gears 21A, 21B, and 21C.

As shown in FIG. 7, the second rotator 51 has a recessed engaging hole 52 with an opening at the top. On the inner peripheral surface over the engaging hole 52, a pair of engaging claws 53, protruding toward the rotational axis R3, are arranged symmetrically to each other with respect to the rotational axis R3.

The protruding end of each engaging claw 53 has a vertically extending flat shape. Inserting the contact tip 12 into the engaging hole 52 will make the protruding end of each engaging claw 53 face an associated flat surface 12b of the contact tip 12.

A middle portion of the second rotator 51 defines a ring portion 54, which protrudes laterally outward and extends around the rotational axis R3. The upper surface of the ring portion 54 is a tapered surface 54a, of which the diameter gradually decreases upward.

A ringlike second stopper member 55 is fitted onto the outer peripheral surface of a portion of the second rotator 51 near the bottom thereof. As the second rotator 51 slides upward, the second stopper member 55 comes into contact with the peripheral edge of the lower opening of the through hole 21b, thus keeping the second rotator 51 from upwardly sliding any farther.

A fourth coil spring 7d is externally fitted onto a middle portion of the second rotator 51. The top of the fourth coil spring 7d abuts with the lower surface of the ring portion 54. On the other hand, the bottom of the fourth coil spring 7d abuts with the peripheral edge of the upper opening of the through hole 21b, thus biasing the second rotator 51 upward.

The lower half of the second rotator 51 is enclosed with a generally cylindrical cover member 57 of rubber. The top of the cover member 57 abuts with the lower surface of the ring portion 54. On the other hand, the bottom of the cover member 57 abuts with the upper surface of the gearbox 2.

Figure 15:
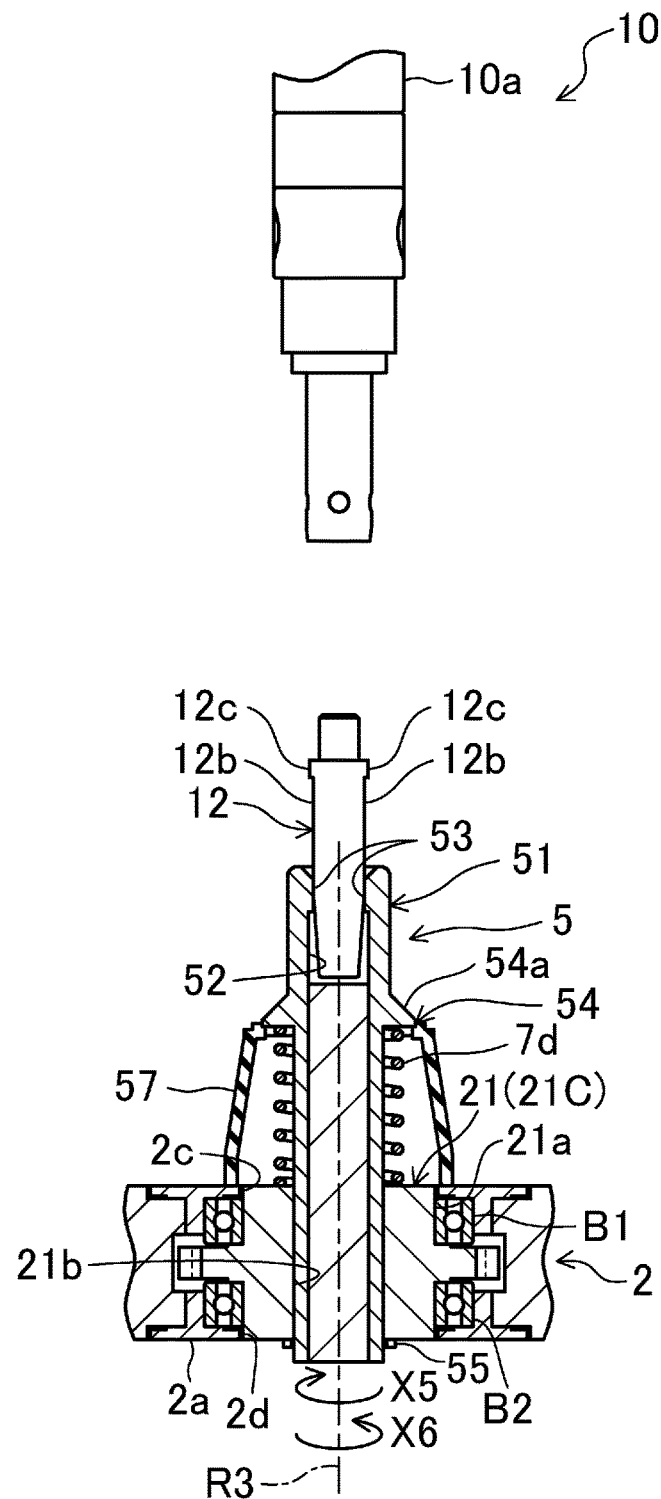
FIG. 15 is a view corresponding to the cross-sectional view of FIG. 7 and illustrating a state where the contact tip is on the verge of being attached to the tip end of the torch body.

To attach a new contact tip 12 to the torch body 10a from which a used contact tip 12 has been removed, the torch body 10a is brought closer toward, and inserted into, the second rotator 51, in which the new contact tip 12 has been set in place, from over the second rotator 51. Then, the tip end of the torch body 10a will come into contact with a base end portion of the contact tip 12 as shown in FIG. 15, thus allowing the second rotator 51 to slide downward against the biasing force of the fourth coil spring 7d.

Figure 16:
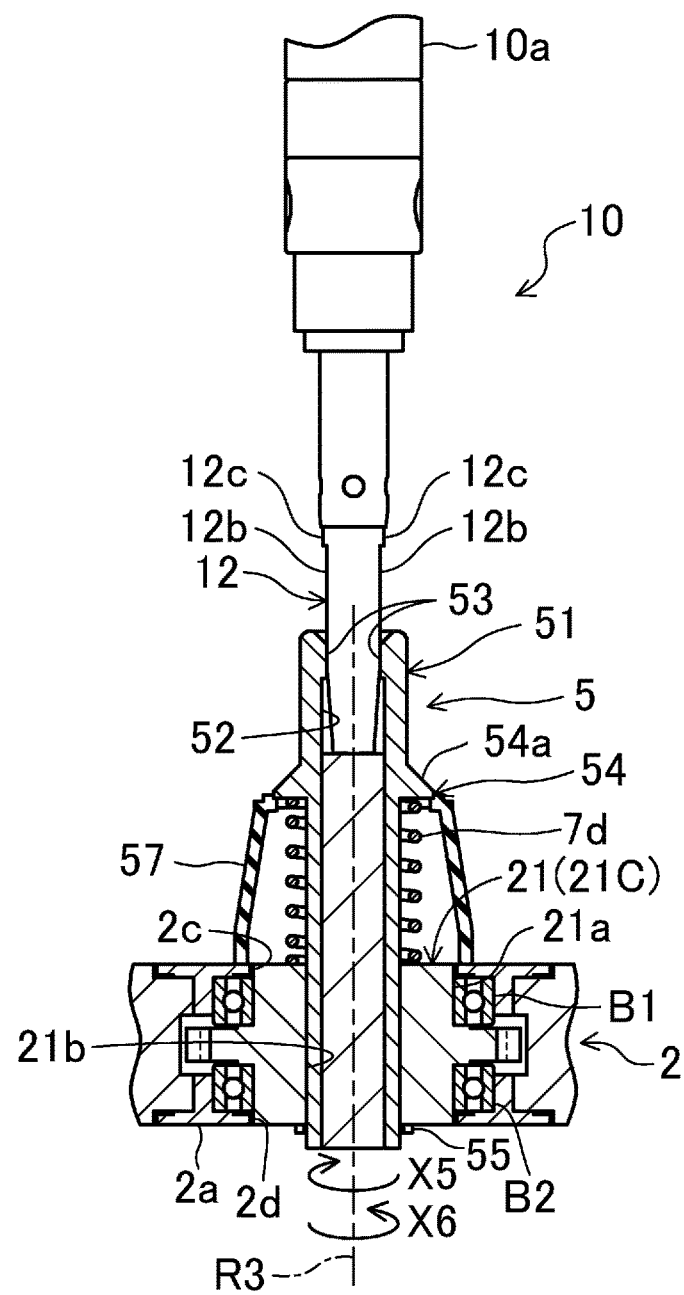
FIG. 16 is a view corresponding to the cross-sectional view of FIG. 7 and illustrating a state where the contact tip is being attached to the tip end of the torch body.

Also, the second rotator 51 is allowed to rotate in the direction X6 while being slid downward by the downward contact of the torch body 10a with the contact tip 12. This makes the contact tip 12 turn on its center axis while allowing the second rotator 51 to slide upward under the biasing force of the fourth coil spring 7d as shown in FIG. 16. Thus, the base end portion of the contact tip 12 gets screwed onto the tip end of the torch body 10a, thus attaching the contact tip 12 onto the torch body 10a.

Next, a specific procedure of removing the nozzle 11 will be described as exemplary replacement work to be done by this rotary changer 1.

First of all, after having done arc welding to a steel plate, for example, a welding torch 10 is transported by an industrial robot (not shown) to a predetermined standby position over the nozzle replacement unit 3.

Next, as shown in FIG. 8, the welding torch 10 is inserted from over the nozzle replacement unit 3 into the hollow 30 of the third cylindrical member 34 such that the center axis of the welding torch 10 is aligned with the rotational axis R1. Then, the tip end portion of the contact tip 12 is inserted into the tip avoiding hole 35b of the pressable member 35 and a tip end portion of the nozzle 11 comes into contact with the decreasing-diameter portion 35c. Thus, the welding torch 10 presses the pressable portion 35 downward.

Next, the third cylindrical member 34 starts to slide downward, along with the pressable member 35 pressed downward by the welding torch 10, with respect to the second cylindrical member 32 against the biasing force of the first coil spring 7a.

Then, the respective moving blocks 36 also move downward along with the third cylindrical member 34 to bring the slidable surface 36c of each of the moving blocks 36 into a sliding contact with the bottom 32e of its associated recess 32d of the second cylindrical member 32. Then, force is applied to press the respective moving blocks 36 toward the rotational axis R1 as shown in FIG. 9. As a result, the respective moving blocks 36 move forward toward the rotational axis R1 to bring the engaging portions 36a into engagement with the engageable portion 11a of the nozzle 11. The engagement established between the engaging portions 36a and the engageable portion 11a keeps the respective moving blocks 36 from moving toward the rotational axis R1 any farther, thus severing the sliding contact between the respective bottoms 32e of the recesses 32d and the respective slidable surfaces 36c of the moving blocks 36.

As the welding torch 10 is moved further downward with the engageable portion 11a engaged with the respective engaging portions 36a, the third cylindrical member 34 and the second cylindrical member 32 start sliding integrally downward with respect to the first cylindrical member 31 against the biasing force of the first and second coil springs 7a and 7b.

Next, the servomotor 6 is started to trigger rotation of the nozzle replacement unit 3 in the direction X1 via the gear 21A. This allows the nozzle 11 to turn on its center axis and be removed from the tip end portion of the torch body 10a as shown in FIG. 10.

Next, a specific procedure of attaching the nozzle 11 will be described as exemplary replacement work to be done by this rotary changer 1.

First of all, the nozzle 11 is set in place in the hollow 30 of the nozzle replacement unit 3 as shown in FIG. 10.

Next, the torch body 10a is transported by an industrial robot (not shown) to a predetermined standby position over the nozzle replacement unit 3 in which the nozzle 11 has already been set in place.

Subsequently, the torch body 10a is moved downward to bring its tip end portion into contact with the peripheral edge of the opening at the base end of the nozzle 11. This allows the third cylindrical member 34 to be pressed by the nozzle 11 in contact with the diameter-decreasing portion 35c of the pressable member 35 and start sliding downward with respect to the second cylindrical member 32 against the biasing force of the first coil spring 7a.

Then, the respective moving blocks 36 also move downward along with the third cylindrical member 34 to bring the slidable surface 36c of each of the moving blocks 36 into a sliding contact with the bottom 32e of its associated recess 32d of the second cylindrical member 32. Then, force is applied to press the respective moving blocks 36 toward the rotational axis R1 as shown in FIG. 9. As a result, the respective moving blocks 36 move forward toward the rotational axis R1 to bring the respective engaging portions 36a of the moving blocks 36 into engagement with the engageable portion 11a of the nozzle 11. The engagement established between the engaging portions 36a and the engageable portion 11a keeps the respective moving blocks 36 from moving toward the rotational axis R1 any farther, thus severing the sliding contact between the respective bottoms 32e of the recesses 32d and the respective slidable surfaces 36c of the moving blocks 36.

As the torch body 10a is moved further downward with the engageable portion 11a engaged with the respective engaging portions 36a, the third cylindrical member 34 and the second cylindrical member 32 start sliding integrally downward with respect to the first cylindrical member 31 against the biasing force of the first and second coil springs 7a and 7b.

Thereafter, the servomotor 6 is started to trigger rotation of the nozzle replacement unit 3 in the direction X2 via the gear 21A. This allows the nozzle 11 to turn on its center axis and be attached to the tip end portion of the torch body 10a as shown in FIG. 9.

Next, a specific procedure of removing the contact tip 12 will be described as exemplary replacement work to be done by this rotary changer 1.

First of all, after the nozzle 11 has been removed by the nozzle replacement unit 3, the welding torch 10 is transported by an industrial robot (not shown) to a predetermined standby position over the removal unit 4 as shown in FIG. 11.

Next, the servomotor 6 is started to rotate the first rotator 41 in the direction X4 via the gears 21A and 21B. In the meantime, the welding torch 10 is moved downward to insert the contact tip 12 into the through hole 41a of the first rotator 41 from over the removal unit 4. Then, even if the arrangement direction of the two flat surfaces 12b of the contact tip 12 is different from that of the two interlocking members 44 while the contact tip 12 is going to be inserted into the through hole 41a as shown in FIG. 11, the arrangement direction of the two flat surfaces 12b of the contact tip 12 can be aligned with that of the two interlocking members 44 as shown in FIGS. 12 and 13. As a result, the respective hooking surfaces 44b of the two interlocking members 44 come into contact with the respective flat surfaces 12b of the contact tip 12.

Thereafter, when allowed to further rotate in the direction X4, the first rotator 41 turns the contact tip 12 on its center axis and removes it from the torch body 10a with the hooking surfaces 44b of the two interlocking members 44 hooked on the respective flat surfaces 12b of the contact tip 12 as shown in FIG. 14. At this time, the respective rear ends of the interlocking members 44 retract into the respective communication holes 41c and the slide bearing 43 of the housing case 42 faces the respective communication holes 41c. Thus, the slide bearing 43 hampers the respective interlocking members 44 from moving backward. This allows the hooking surfaces 44b of the respective interlocking members 44 to be firmly hooked on the respective flat surfaces 12b of the contact tip 12.

In this state, the used contact tip 12 removed from the torch body 10a has its projecting portions 12c kept in contact with the respective interlocking members 44 from over them, and therefore, remains held by the removal unit 4.

Next, a specific procedure of disposing of the used contact tip 12 held in the removal unit 4 will be described.

As shown in FIG. 18, a welding torch 10 that is going to have its contact tip 12 removed next is transported by an industrial robot (not shown) to a predetermined position over the removal unit 4 and also moved downward, thereby downwardly pressing the base end of the used contact tip 12 with the tip end portion of the contact tip 12 attached to the torch body 10a. Then, both of the projecting portions 12c of the used contact tip 12 press the two interlocking members 44 downward, thus allowing the first rotator 41 to start moving down against the biasing force of the third coil spring 7c.

When the first rotator 41 moves down to a predetermined degree, the slide bearing 43 reaches a position to uncover the respective communication holes 41c of the first rotator 41, thus allowing the respective interlocking members 44 to move backward as shown in FIGS. 19 and 20.

Thereafter, as the welding torch 10 is further moved downward, the respective projecting portions 12*c* of the used contact tip 12 will start making a sliding contact with the hooking surfaces 44*b* (i.e., the first sloped surfaces 44*c*) of the respective interlocking members 44. This makes the used contact tip 12 start moving downward through the through hole 41*a*. Then, the respective interlocking members 44 move backward against the biasing force of the O-ring 45. As a result, the respective protruding portions 44*a* of the interlocking members 44 retract into the communication holes 41*c*, thus allowing the used contact tip 12 to drop down and be disposed of as shown in FIG. 21. In this manner, according to the present disclosure, the used contact tip 12 held in the removal unit 4 may be disposed of easily.

Thereafter, the drop of the used contact tip 12 allows the respective interlocking members 44 to move forward toward the through hole 41*a* under the biasing force of the O-ring 45. Thus, even if the respective rear ends of the interlocking members 44 retract into the communication holes 41*c* to cause the first rotator 41 to slide upward, the respective interlocking members 44 are still out of contact with the slide bearing 43.

Then, the biasing force of the third coil spring 7*c* causes the first rotator 41 to slide upward, thus making the respective communication holes 41*c* face the slide bearing 43. In the meantime, the contact tip 12 to be removed next from the welding torch 10 is set in place in the removal unit 4, thus getting the next contact tip 12 removal work ready to be started. Thus, simply downwardly pressing the used contact tip 12 removed allows the used contact tip 12 to be disposed of Consequently, the contact tip 12 removal work may be repeatedly carried out highly efficiently just by downwardly pressing the used contact tip 12 through the insertion of the contact tip 12 to be removed next into the through hole 41*a*.

Next, a specific procedure of attaching the contact tip 12 will be described as exemplary replacement work to be done by this rotary changer 1.

After the contact tip 12 has been removed by the removal unit 4 from the welding torch 10, the torch body 10*a* is transported by an industrial robot (not shown) to a predetermined standby position over the second rotator 51 in which a new contact tip 12 has been set in place as shown in FIG. 15.

Next, the torch body 10*a* is moved downward. Then, the tip end of the torch body 10*a* will come into contact with the base end portion of the contact tip 12 that has been set in place in the second rotator 51. At the same time, the second rotator 51 is pressed by the welding torch 10 to slide downward against the biasing force of the fourth coil spring 7*d*.

Thereafter, the servomotor 6 is started to rotate the second rotator 51 in the direction X6 via the gears 21A, 21B, and 21C. Then, as shown in FIG. 16, the second rotator 51 upwardly moves, under the biasing force of the fourth coil spring 7*d*, the contact tip 12 that has been set in place in the second rotator 51. In addition, the second rotator 51 also turns the contact tip 12 on its center axis while getting the respective engaging claws 53 hooked on the respective flat surfaces 12*b* of the contact tip 12. This allows the contact tip 12 to be attached to the torch body 10*a* by screwing the base end portion of the contact tip 12 onto the tip end of the torch body 10*a*.

Figure 17:
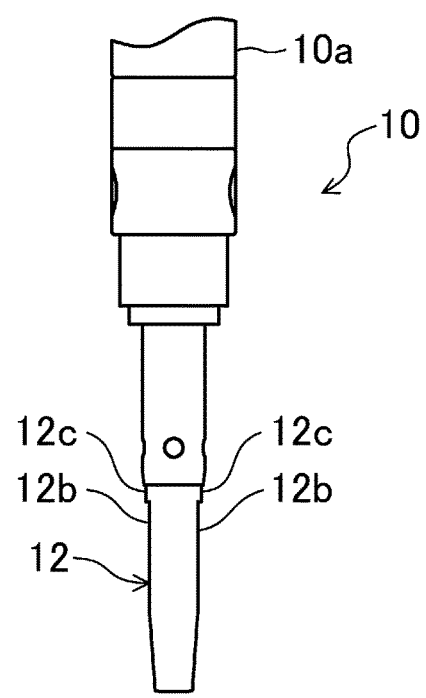
FIG. 17 is a view corresponding to the cross-sectional view of FIG. 7 and illustrating a state where the contact tip has just been attached to the tip end of the torch body.
Figure 17:
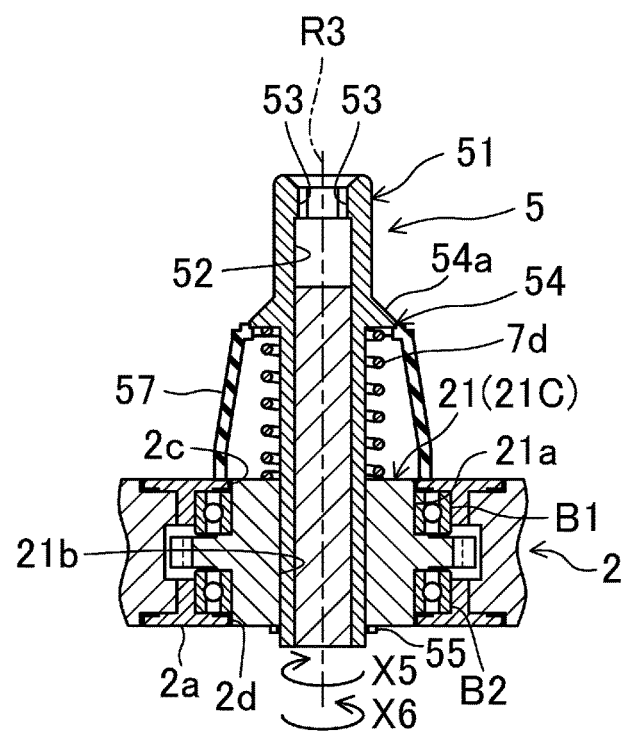

Thereafter, as shown in FIG. 17, the welding torch 10 to which the new contact tip 12 has been attached is moved upward to finish the contact tip 12 attaching work.

As can be seen from the foregoing description, according to the first embodiment of the present disclosure, when the nozzle 11 is inserted and housed in the hollow 30 of the third cylindrical member 34, the moving blocks 36 bring the center axis of the nozzle 11 into alignment with the rotational axis R1 of the third cylindrical member 34, or at least make the center axis proximate to the rotational axis R1. Likewise, when the contact tip 12 is inserted and housed in the through hole 41*a* of the first rotator 41, the interlocking members 44 bring the center axis of the contact tip 12 into alignment with the rotational axis R2 of the first rotator 41, or at least make the center axis proximate to the rotational axis R2. This eliminates the need for providing any guide plate such as the one disclosed in Japanese Unexamined Patent Publication No. 2002-192345 outside of the third cylindrical member 34 or outside of the first rotator 41. Consequently, the size of the rotary changer 1 can be reduced in the direction in which the rotational axis R1 of the third cylindrical member 34 or the rotational axis R2 of the first rotator 41 extends.

The relative positions of the nozzle 11 and the moving blocks 36 may be changed in a direction intersecting with the rotational axis R1. Thus, allowing the moving blocks 36 to move backward in advance toward positions where the moving blocks 36 can avoid contact with the nozzle 11 while inserting the nozzle 11 into the hollow 30 of the third cylindrical member 34 minimizes the deformation or damage that could be caused around the moving blocks 36. Meanwhile, allowing the moving blocks 36 to move forward will bring their frontend portions into contact with the outer peripheral surface of the nozzle 11, thus not only determining the position of the nozzle 11 with respect to the third cylindrical member 34 but also attaching or removing the nozzle 11 in conjunction with the outer peripheral surface of the nozzle 11.

Furthermore, allowing the interlocking members 44 to move forward will bring their frontend portions into contact with the outer peripheral surface of the contact tip 12, thus not only determining the position of the contact tip 12 with respect to the first rotator 41 but also removing the contact tip 12 in conjunction with the outer peripheral surface of the contact tip 12.

On top of that, two portions (i.e., the hooking surface 44*b*) of the first rotator 41 get hooked on two portions (i.e., the flat surface 12*b*) of the contact tip 12 that are located symmetrically to each other with respect to the center axis thereof, thus allowing the contact tip 12 to turn on its center axis. This facilitates the contact tip's 12 rotation with its center axis aligned with the rotational axis R2 of the first rotator 41 during the removal of the contact tip 12. Consequently, this allows for avoiding an unwanted situation where removal of the contact tip 12 with the center axis of the contact tip 12 misaligned with the rotational axis R2 of the first rotator 41 does damage to a portion of the torch body 10*a* screwed onto the contact tip 12.

Furthermore, biasing the interlocking members 44 toward the through hole 41*a* with the O-ring 45 allows the interlocking member 44 to move forward using a simple structure, thus cutting down the manufacturing cost.

Moreover, the second recessed grooves 44*d* cut on the interlocking member 44 prevent the O-ring 45 from being disengaged from the interlocking members 44, thus conveying the biasing force of the O-ring 45 to the interlocking members 44 with reliability. Consequently, while the contact tip 12 is being removed, the hooking surfaces 44*b* of the interlocking members 44 may get hooked on the flat surfaces 12*b* of the contact tip 12 as intended.

Added to that, when downwardly pressed, the used contact tip 12 being held by the first rotator 41 via the projecting portions 12c moves downward while keeping the projecting portions 12c in sliding contact with the first sloped surfaces 44c of the hooking surfaces 44b. Thus, the used contact tip 12 receives decreased reactive force from the interlocking members 44 along its center axis. Consequently, the load produced while the used contact tip 12 is being pressed downward decreases so much as to allow the used contact tip 12 to move downward smoothly.

In the foregoing description of an embodiment of the present disclosure, it has been described how to remove the contact tip 12 with the projecting portions 12c from the torch body 10a using the rotary changer 1. Alternatively, the rotary changer 1 of the present disclosure may also be used to remove a contact tip 12, having no projecting portions 12c and having flat surfaces 12b on its outer peripheral surface and along its center axis, from the torch body 10a. In that case, the contact tip 12 with no projecting portions 12c will be removed from the torch body 10a and then allowed to drop and be disposed of as it is without being held in the removal unit 4.

In the embodiment of the present disclosure described above, the second and third cylindrical members 32 and 34 and the first and second rotators 41 and 51 are biased upward with the first to fourth coil springs 7a-7d. However, this is only an example. Alternatively, the second cylindrical member 32 and other members may also be biased upward with any other types of springs.

Furthermore, in the embodiment of the present disclosure described above, the respective interlocking members 44 are biased with the O-ring 45. However, this is only an example. Alternatively, the respective interlocking members 44 may also be biased with any other biasing member.

Second Embodiment of the Present Disclosure

FIGS. 22-29 illustrate a removal unit 4 for a rotary changer 1 according to a second embodiment of the present disclosure. This second embodiment is basically the same as the first embodiment described above except the structure of some parts of the removal unit 4 and the way of disposing of the used contact tip 12 removed from the torch body 10a. Thus, the following description of the second embodiment will be focused on only the differences from the first embodiment.

The thickened portion 41b of the first rotator 41 according to the second embodiment has no first recessed grooves 41e unlike the counterpart of the first embodiment.

No stopper members 41d such as the counterpart of the first embodiment are fitted onto the outer peripheral surface of the first rotator 41 near the bottom thereof.

Furthermore, a mortar-shaped contact portion 41f is formed at the peripheral edge of the upper opening of the through hole 41a of the first rotator 41. The contact portion 41f contacts with the torch body 10a when the contact tip 12 is inserted into the through hole 41a from over the removal unit 4.

A vertical middle portion of the outer periphery of the housing case 42 of this second embodiment is not recessed unlike the first embodiment.

Instead, the housing case 42 is comprised of an upper wall portion 42c, a middle wall portion 42d, and a lower wall portion 42e, which all have approximately the same vertical width.

The inner peripheral surface of the upper wall portion 42c is located at such a position as to leave a gap Si with respect to the outer peripheral surface of the first rotator 41.

Meanwhile, the inner peripheral surface of the middle wall portion 42d is outwardly recessed stepwise with respect to the inner peripheral surface of the upper wall portion 42c.

A slide bearing 43 according to the second embodiment is fitted onto the inner peripheral surface of the middle wall portion 42d so as to be slidable vertically. Sliding the slide bearing 43 upward will bring the top of the bearing 43 into contact with the upper wall portion 42c, thus keeping the slide bearing 43 from sliding upward any farther.

The inner peripheral surface of the lower wall portion 42e is outwardly recessed stepwise with respect to the inner peripheral surface of the middle wall portion 42d.

The inner edge at the top of the slide bearing 43 defines a second sloped surface 43a, which gradually slopes downward with decreasing distance from the rotational axis R2.

That is to say, the second sloped surface 43a is located at the top of the protruding end facet of the annular projection 42b.

The slide bearing 43 further has a flange portion 43b, which protrudes laterally outward, near the bottom thereof. The flange portion 43b is located at such a position as to face the lower wall portion 42e.

The interlocking members 44 of the second embodiment have no second recessed grooves 44d such as the ones of the first embodiment or no O-rings 45, either.

The upper half of the gear 21B according to the second embodiment has an annular step portion 21c with an L-cross section, which extends along the through hole 21b. Under the annular step portion 21c, a fitting step portion 21d with an L-cross section, on which the bottom of the third coil spring 7c is fitted, extends along the through hole 21b as well.

The third coil spring 7c of the second embodiment serves as the third biasing member of the present disclosure, and biases the first rotator 41 upward such that the communication holes 41c are located over the second sloped surface 43a.

A fifth coil spring 7e is externally fitted onto the third coil spring 7c.

The top of the fifth coil spring 7e abuts with the flange portion 43b of the slide bearing 43. On the other hand, the bottom of the fifth coil spring 7e abuts with the annular step portion 21c, thus biasing the slide bearing 43 upward.

Figure 22:
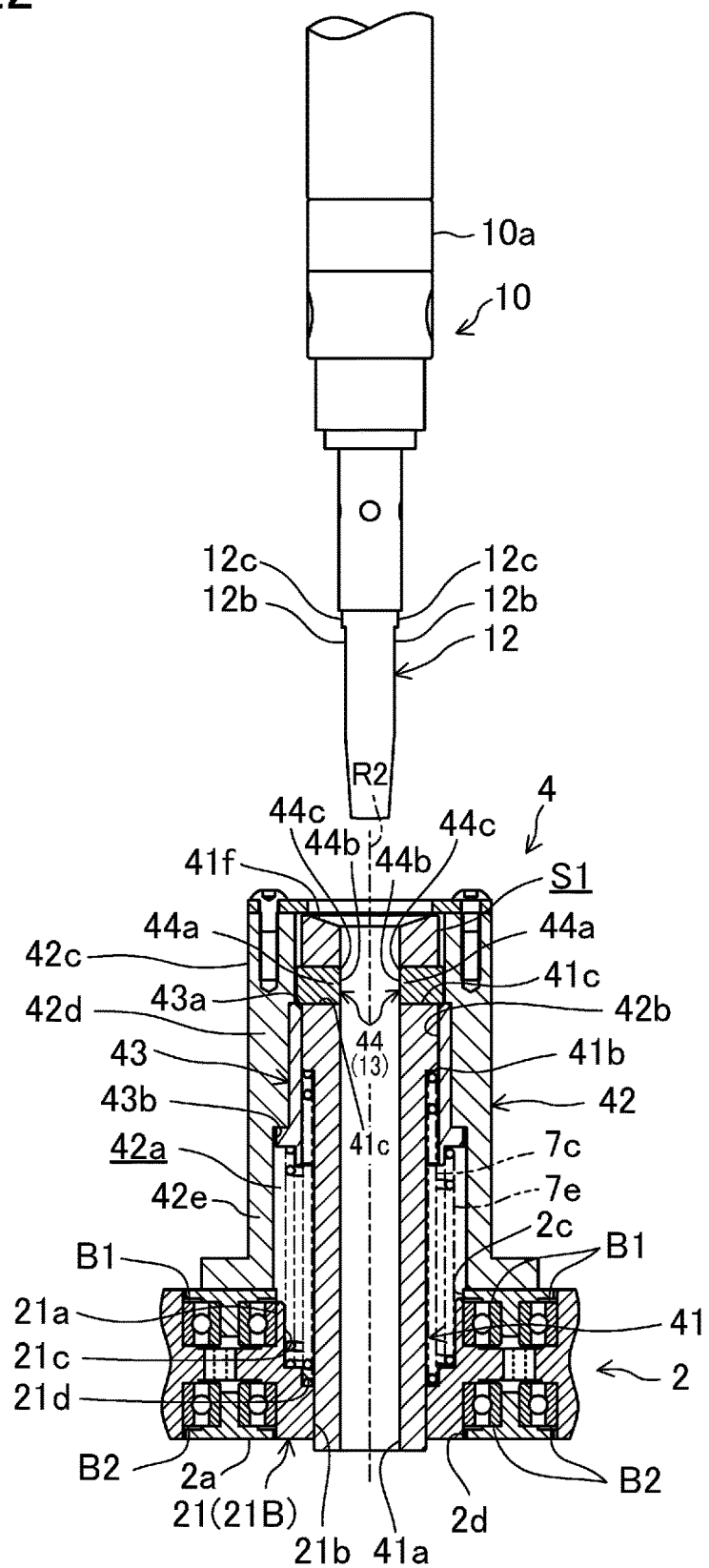
FIG. 22 is a view illustrating a second embodiment of the present disclosure and corresponding to FIG. 5.
Figure 23:
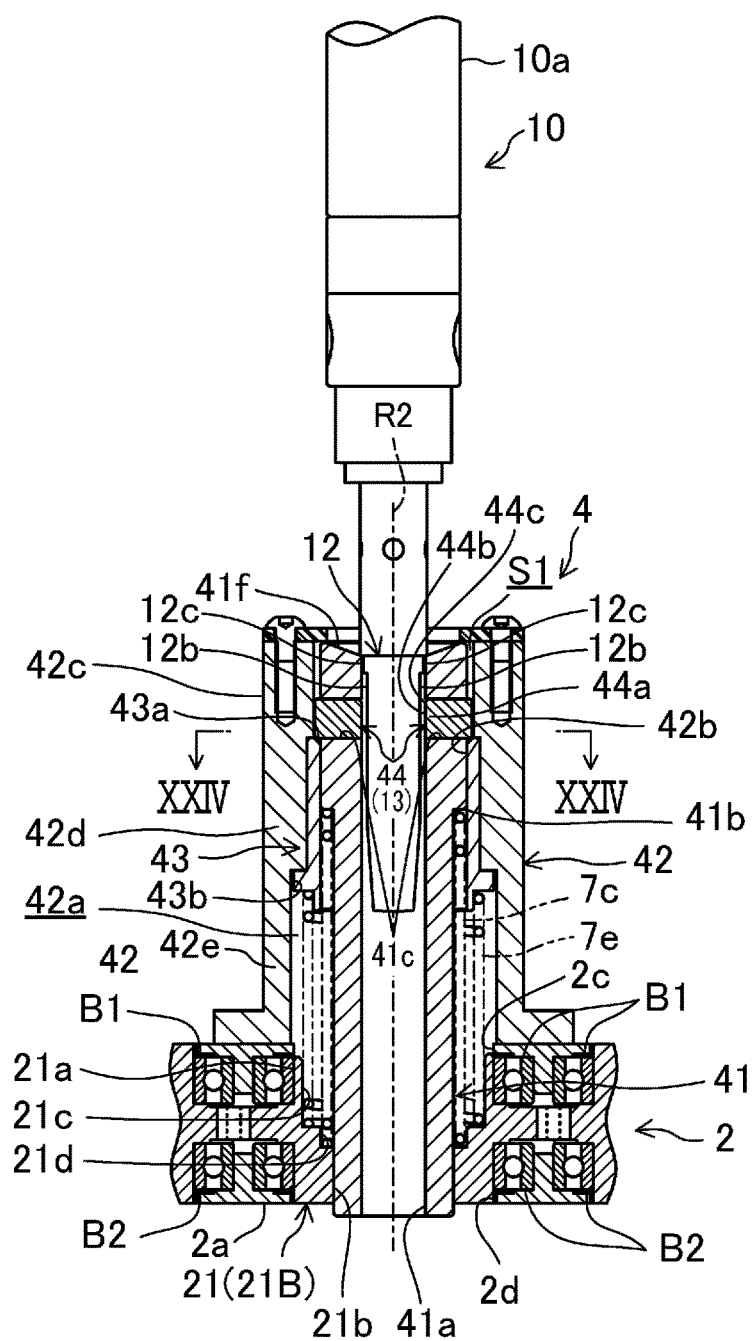
FIG. 23 is a view corresponding to the cross-sectional view of FIG. 22 and illustrating a state where the contact tip has just been inserted into the rotator inside the removal unit.
Figure 24:
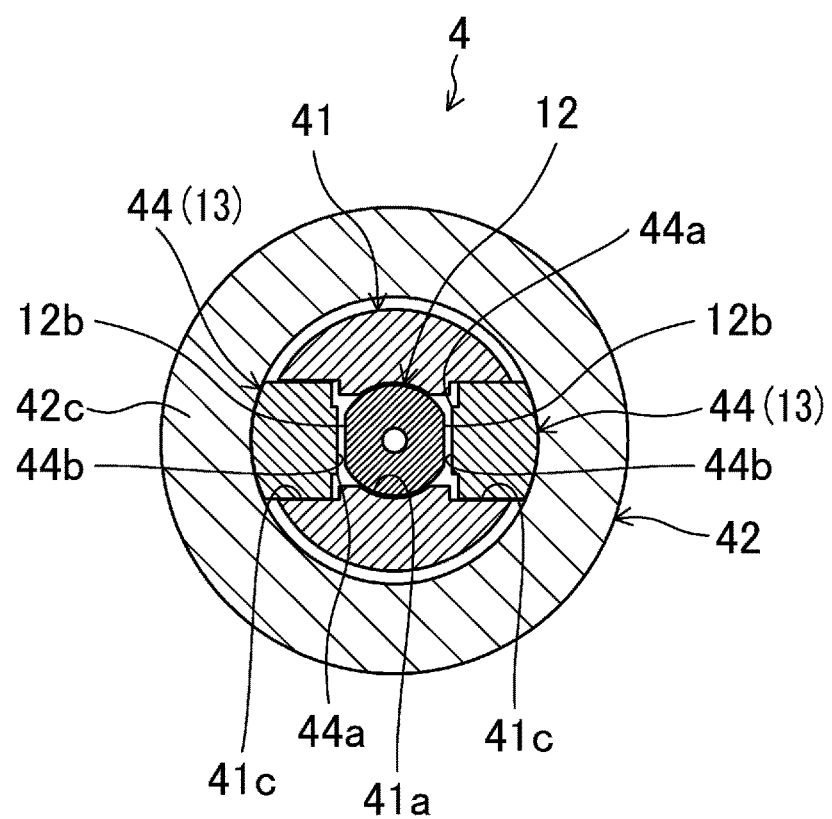
FIG. 24 is a cross-sectional view taken along the plane XXIV-XXIV shown in FIG. 23.

Then, as shown in FIGS. 22 and 23, when the contact tip 12 is inserted into the through hole 41a from over the removal unit 4 such that its tip faces downward, the torch body 10a will come into contact with the contact portion 41f of the first rotator 41.

Figure 25:
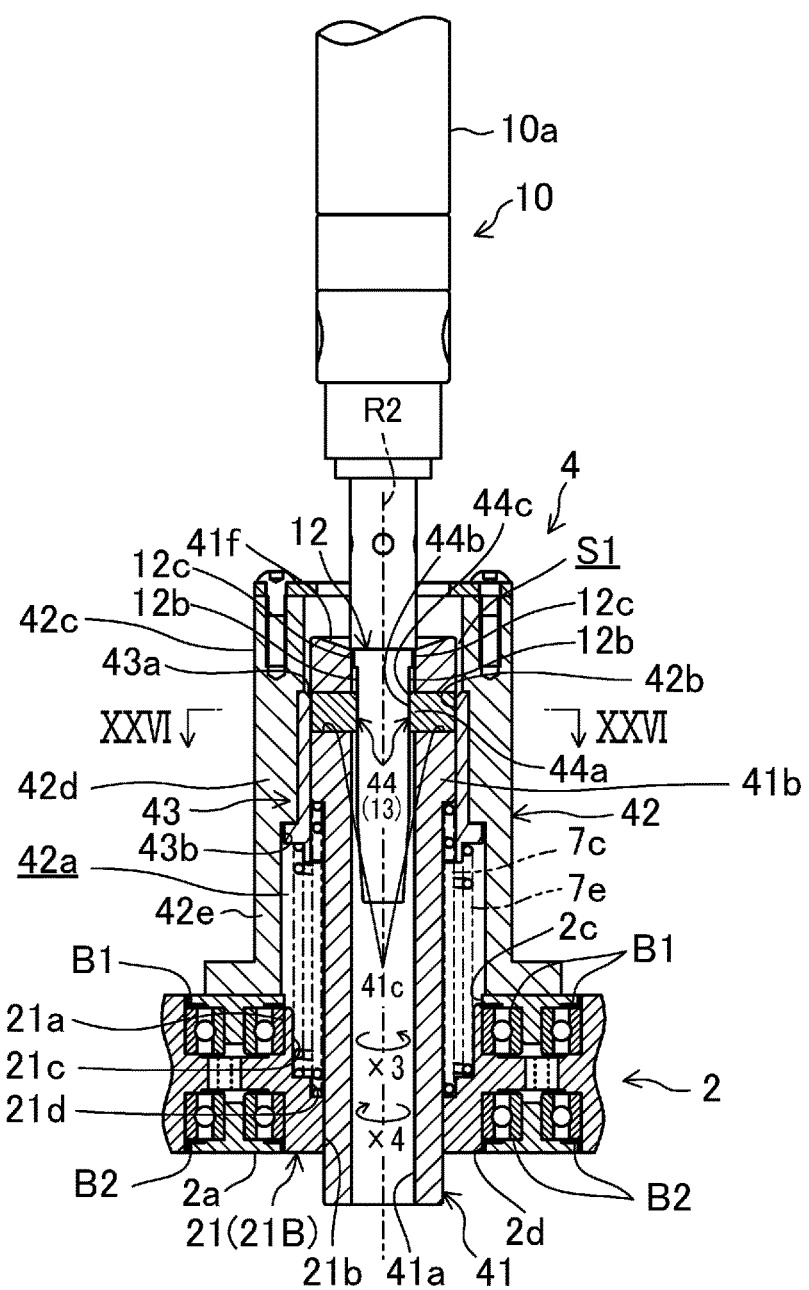
FIG. 25 is a view corresponding to the cross-sectional view of FIG. 22 and illustrating a state where the contact tip is on the verge of being removed from the tip end of the torch body.
Figure 26:
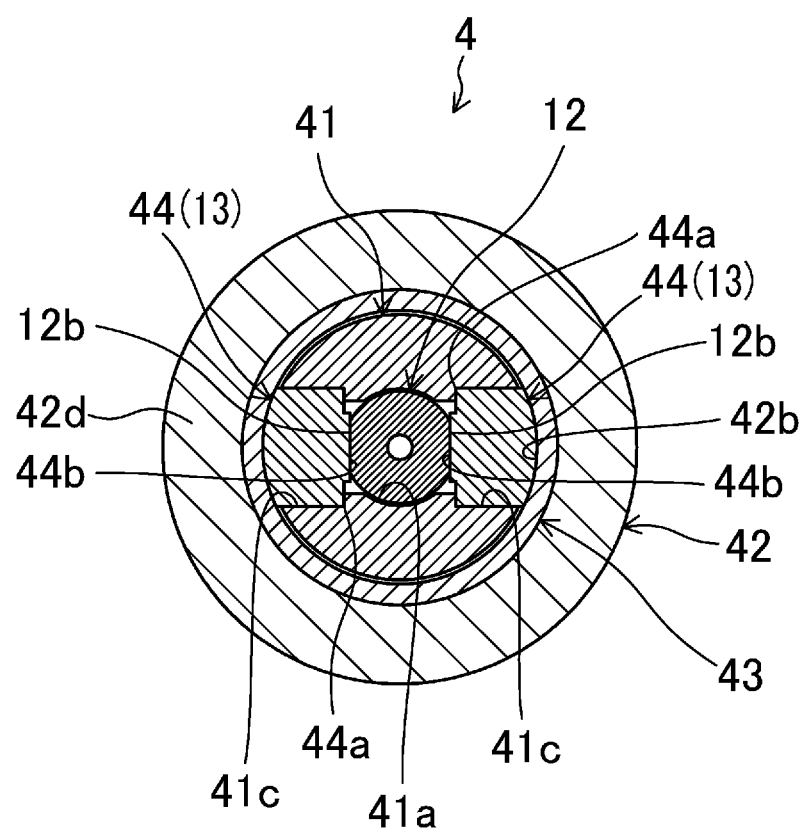
FIG. 26 is a cross-sectional view taken along the plane XXVI-XXVI shown in FIG. 25.

As the welding torch 10 is moved further downward the first rotator 41 is allowed to rotate in the normal direction rotation direction, the second sloped surface 43a of the slide bearing 43 makes a sliding contact with the respective rear ends of the interlocking members 44, which are moving downward along with the first rotator 41, thus pressing the respective interlocking members 44 toward the rotational axis R2 as shown in FIG. 25. The interlocking members 44 thus pressed are guided along the communication holes 41c to move forward toward the rotational axis R2. In addition, the respective protruding portions 44a pop out of the communication holes 41c, thus bringing the respective hooking surfaces 44b into contact with the respective flat surfaces 12b of the contact tip 12.

That is to say, the second sloped surface 43a serves as a cam member for allowing the respective interlocking members 44 to move forward synchronously with the downward movement of the first rotator 41.

As the interlocking members 44 move forward toward the rotational axis R2, the respective rear ends of the interlocking members 44 retract into the communication holes 41c and the first rotator 41 moves downward against the biasing force of the third coil spring 7c. As a result, the respective communication holes 41c face the slide bearing 43.

That is to say, the annular projection 42b (i.e., the slide bearing 43) is switched from the state of uncovering the respective communication holes 41c into the state of covering the communication holes 41c by the downward movement of the first rotator 41.

Figure 27:
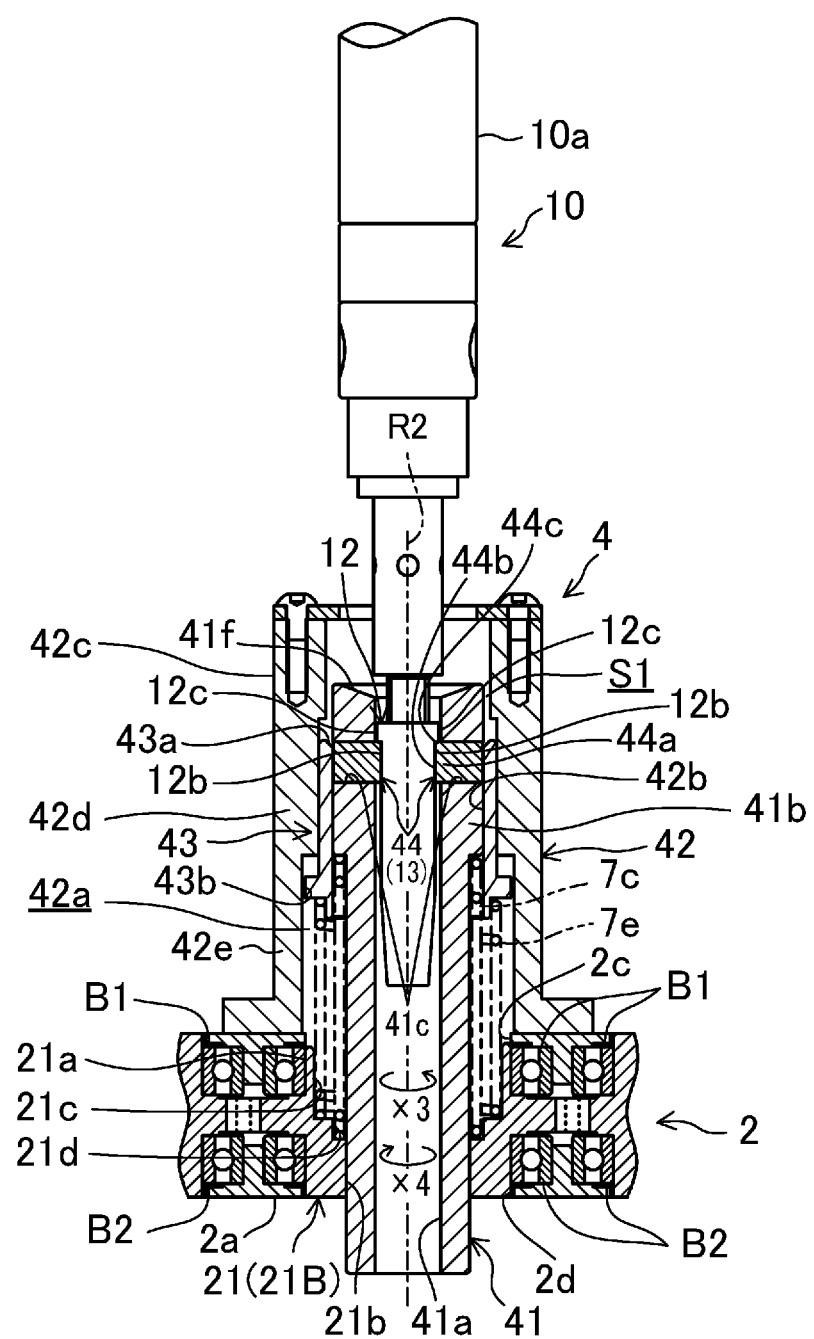
FIG. 27 is a view corresponding to the cross-sectional view of FIG. 22 and illustrating a state where the contact tip has just been removed from the tip end of the torch body.

As the first rotator 41 is allowed to further rotate in the normal direction rotation direction, the respective hooking surfaces 44b of the interlocking members 44 will get hooked on the respective flat surfaces 12b of the contact tip 12 inserted into the through hole 41a as shown in FIG. 27. This applies force to the respective interlocking members 44 in the direction away from the rotational axis R2, and increases the frictional resistance between the slide bearing 43 and the respective interlocking members 44. Thus, turning the contact tip 12 on its center axis while allowing the first rotator 41 to rotate, along with the slide bearing 43, in the normal direction rotation direction will get the contact tip 12 screwed off downward, and removed from the torch body 10a.

Screwing off the contact tip 12 downward while removing the contact tip 12 from the torch body 10a allows the respective projecting portions 12c of the contact tip 12 to press the protruding portions 44a of the interlocking members 44 downward. Thus, the first rotator 41 and the slide bearing 43 move downward integrally against the biasing force of the third and fifth coil springs 7c and 7e.

As the torch body 10a, from which the used contact tip 12 has been removed, is moved slowly upward, the slide bearing 43 goes upward under the biasing force of the fifth coil spring 7e and the first rotator 41 also goes upward under the biasing force of the third coil spring 7c. Thus, the respective communication holes 41c reach positions where the holes 41c do not face the slide bearing 43 anymore.

That is to say, the annular projection 42b (i.e., the slide bearing 43) is switched from the state of covering the respective communication holes 41c to the state of uncovering the communication holes 41c by the upward movement of the first rotator 41.

Figure 28:
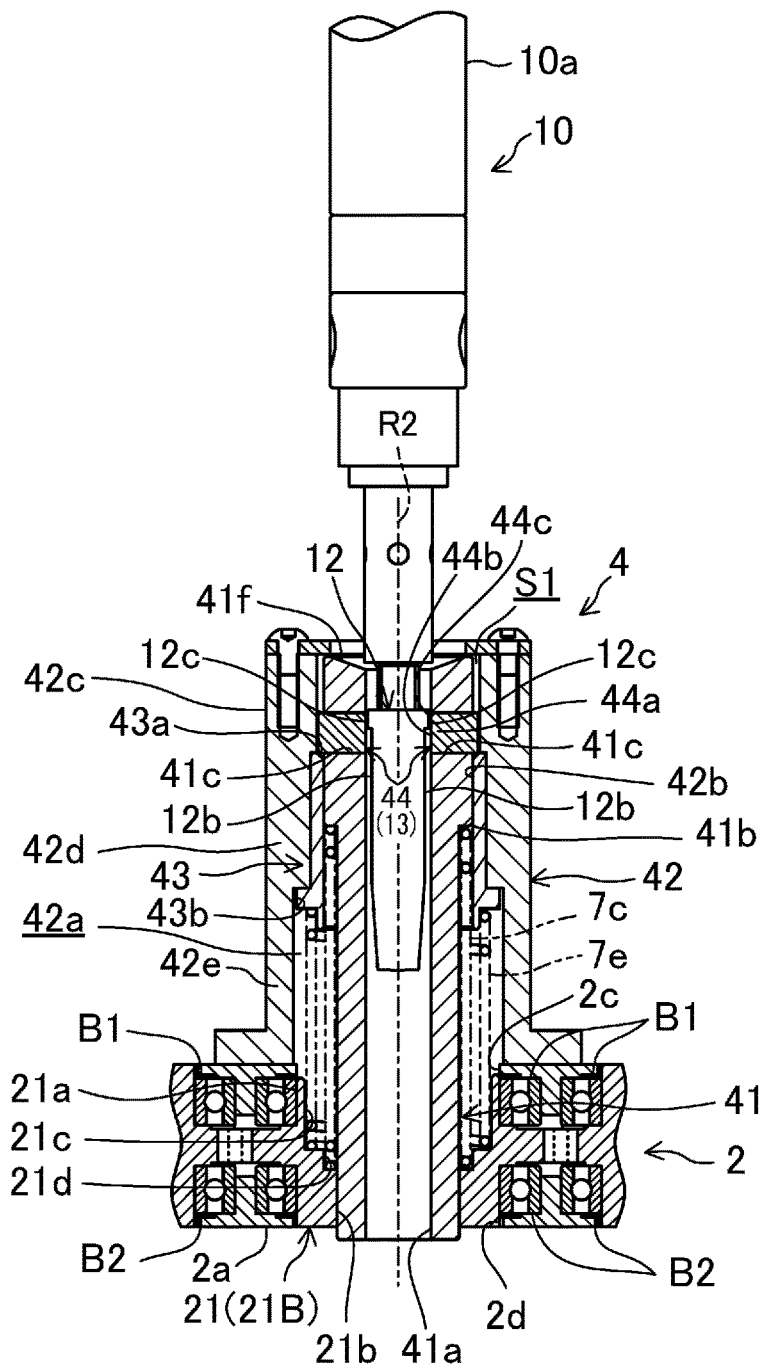

When the respective communication holes 41c reach positions where the holes 41c do not face the slide bearing 43 anymore, the used contact tip 12 is in contact with the torch body 10a from under the torch body 10a under the biasing force of the third coil spring 7c as shown in FIG. 28. The upward movement of the used contact tip 12 applies repulsion against the biasing force of the third coil spring 7c from the torch body 10a to the used contact tip 12. Thus, the respective projecting portions 12c of the contact tip 12 press the respective interlocking members 44 in the direction away from the through hole 41a while making a sliding contact with the respective protruding portions 44a of the interlocking members 44.

Figure 29:
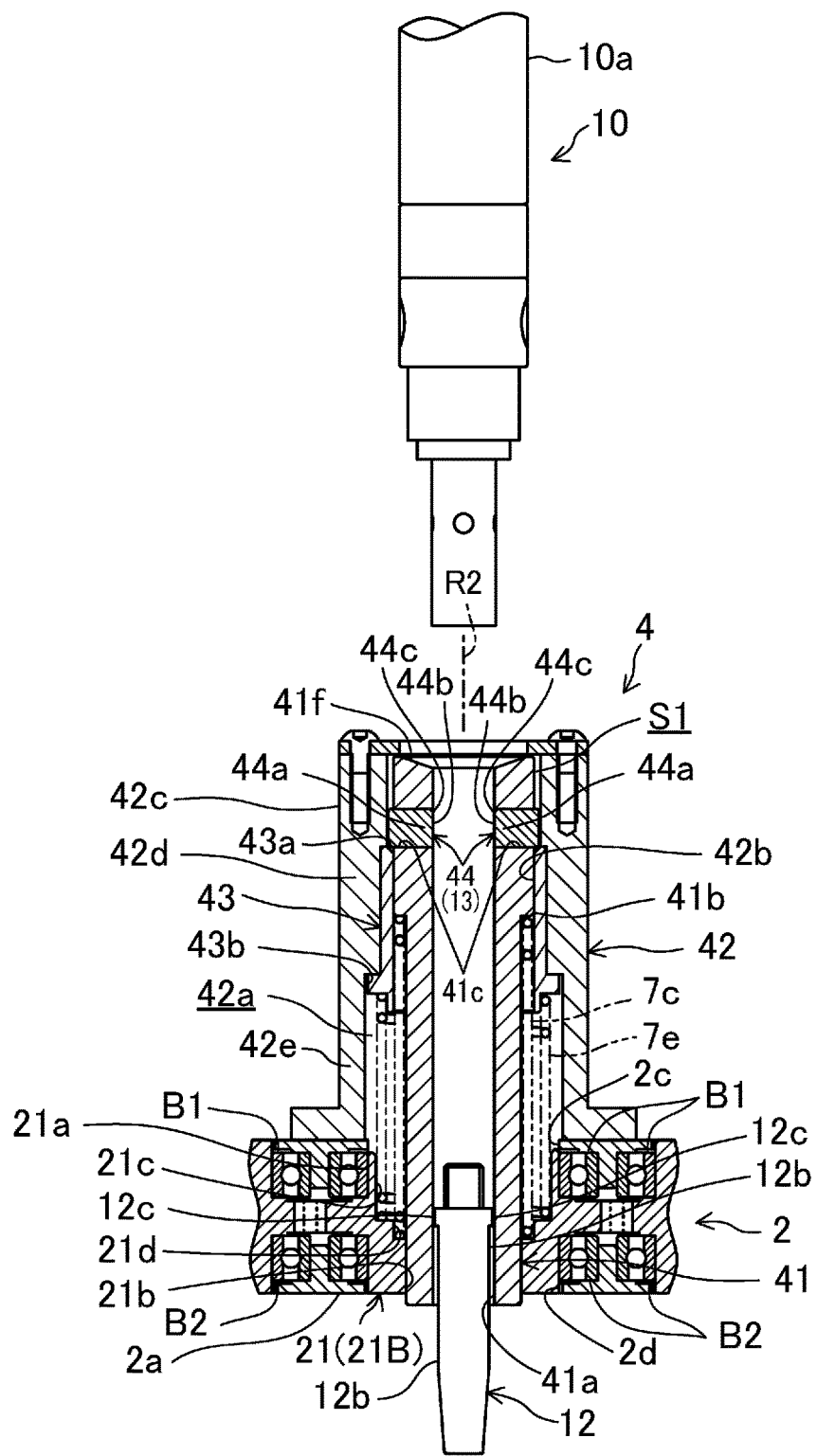
FIG. 29 is a view corresponding to the cross-sectional view of FIG. 22 and illustrating a state where the contact tip removed has just been disposed of FIG. 30 is a view illustrating a third embodiment of the present disclosure and corresponding to FIG. 22.

Then, the backward movement of the respective interlocking members 44 allows the protruding portions 44a of the respective interlocking members 44 to retract into the communication holes 41c and also allows the contact tip 12 to drop through the through hole 41a and be disposed of as shown in FIG. 29.

Next, it will be described how the removal unit 4 of the second embodiment removes and disposes of the contact tip 12.

After the nozzle 11 has been removed by the nozzle replacement unit 3, the welding torch 10 is transported by an industrial robot (not shown) to a standby position over the removal unit 4 as shown in FIG. 22.

Subsequently, the contact tip 12 is inserted into the through hole 41a of the first rotator 41 from over the removal unit 4 with the welding torch 10 moved downward. Then, the torch body 10a will come into contact with a contact portion 41f of the first rotator 41 as shown in FIG. 23, thus applying downward force to the first rotator 41.

Thereafter, the welding torch 10 is moved further downward and the servomotor 6 is started to rotate the first rotator 41 in the direction X4 via the gears 21A and 21B. Then, the respective interlocking members 44 move downward along with the first rotator 41, thus bringing the respective rear ends of the interlocking members 44 into a sliding contact with the second sloped surface 43a of the slide bearing 43. This applies force toward the rotational axis R2 to the respective interlocking members 44 and allows the respective interlocking members 44 to move forward toward the rotational axis R2 as shown in FIG. 25. In addition, the respective protruding portions 44a pop out of the respective communication holes 41c, thus bringing the respective hooking surfaces 44b into contact with the respective flat surfaces 12b of the contact tip 12.

As the interlocking members 44 move forward toward the rotational axis R2, the respective rear ends of the interlocking members 44 retract into the communication holes 41c, thus allowing the first rotator 41 to move downward against the biasing force of the third coil spring 7c and making the respective communication holes 41c face the slide bearing 43.

After that, as the first rotator 41 is allowed to further rotate in the direction X4, the respective hooking surfaces 44b of the interlocking members 44 will get hooked on the respective flat surfaces 12b of the contact tip 12 as shown in FIG. 27, thus applying force to the respective interlocking members 44 in the direction away from the rotational axis R2. Then, the frictional resistance between the slide bearing 43 and the respective interlocking members 44 increases so much as to allow the first rotator 41 to rotate integrally with the slide bearing 43.

The integral rotation of the first rotator 41 and the slide bearing 43 allows the contact tip 12 to not only turn on its center axis but also start screwing off downward, which brings the respective projecting portions 12c of the contact tip 12 into contact with the protruding portions 44a of the interlocking members 44.

As the contact tip 12 screws further downward, the respective projecting portions 12c of the contact tip 12 press the protruding portions 44a of the interlocking members 44 downward. Thus, the first rotator 41 and the slide bearing 43 gradually move downward against the biasing force of the third and fifth coil springs 7c and 7e while rotating integrally with each other. When the first rotator 41 and the slide bearing 43 move down to reach a predetermined position, the contact tip 12 comes loose from the torch body 10a.

The used contact tip 12 that has been removed from the torch body 10a has its projecting portions 12c pressed upward by the respective interlocking members 44 under the biasing force of the third and fifth coil springs 7c and 7e, thus coming into contact with the torch body 10a.

Thereafter, as the torch body 10a is moved slowly upward, the slide bearing 43 goes upward under the biasing force of the fifth coil spring 7e and the first rotator 41 goes upward under the biasing force of the third coil spring 7c. This allows the contact tip 12 to move upward as well while keeping in contact with the torch body 10a. When the first rotator 41 moving upward reaches a position where the respective communication holes 41c do not face the slide bearing 43 anymore, the upward movement of the contact tip 12 applies repulsion against the biasing force of the third coil spring 7c from the torch body 10a to the used contact tip 12. Then, the respective projecting portions 12c of the used contact tip 12 press the respective interlocking members 44 in the direction away from the through hole 41a while making a sliding contact with the respective protruding portions 44a of the interlocking members 44.

Thereafter, as shown in FIGS. 28 and 29, as the respective interlocking members 44 move backward, the projecting portions 44a of the respective interlocking members 44 retract into the communication holes 41c, thus letting the used contact tip 12 drop down through the through hole 41a and be disposed of. As can be seen, as the torch body 10a is moved upward after the used contact tip 12 has been removed, the first rotator 41 moves upward under the biasing force of the third coil spring 7c. This makes the annular projection 42b (or the slide bearing 43) uncover the communication holes 41c and gets the interlocking members 44 ready to move backward. This allows the protruding portions 44a of the interlocking members 44 to retract into the communication holes 41c and the used contact tip 12 to drop downward and be disposed of.

As can be seen from the foregoing description, according to the second embodiment of the present disclosure, the downward movement of the first rotator 41 allows the interlocking members 44 to move forward toward the through hole 41a and the hooking surfaces 44b thereof to get hooked on the flat surfaces 12b of the contact tip 12. That is why there is no need to separately provide any additional drive source for allowing the interlocking member 44 to move forward, thus cutting down the cost of the rotary changer. In addition, the pressure applied by the hooking surfaces 44b onto the flat surfaces 12b of the contact tip 12 increases the degree of close contact between the contact tip 12 and the interlocking members 44, thus enhancing the degree of hooking between the contact tip 12 and the interlocking members 44.

In addition, as the first rotator 41 is moved downward with the respective rear ends of the interlocking members 44 popping out of the communication holes 41c, the rear ends of the interlocking members 44 will make a sliding contact with the second sloped surface 43a, thus allowing the interlocking members 44 to move forward toward the through hole 41a. Consequently, the structure of the interlocking members 44 working in conjunction with the downward movement of the first rotator 41 is simplified and the cost of the rotary changer can be cut down for this reason as well.

In the second embodiment of the present disclosure described above, the second sloped surface 43a is located at the top of the protruding end facet of the annular projection 42b. Alternatively, the second sloped surface 43a may also be located at the bottom of the protruding end facet of the annular projection 42b. The interlocking members 44 may be slid toward the through hole 41a by allowing the respective other ends of the interlocking members 44 to make a sliding contact with the second sloped surface 43a as the first rotator 41 moves upward.

Third Embodiment of the Present Disclosure

FIGS. 30-36 illustrate a removal unit 4 for a rotary changer 1 according to a third embodiment of the present disclosure. This third embodiment is basically the same as the second embodiment described above except the structure of some parts of the removal unit 4 and the way of disposing of the used contact tip 12 that has been removed from the torch body 10a. Thus, the following description of the third embodiment will be focused on only the differences from the second embodiment.

Figure 30:
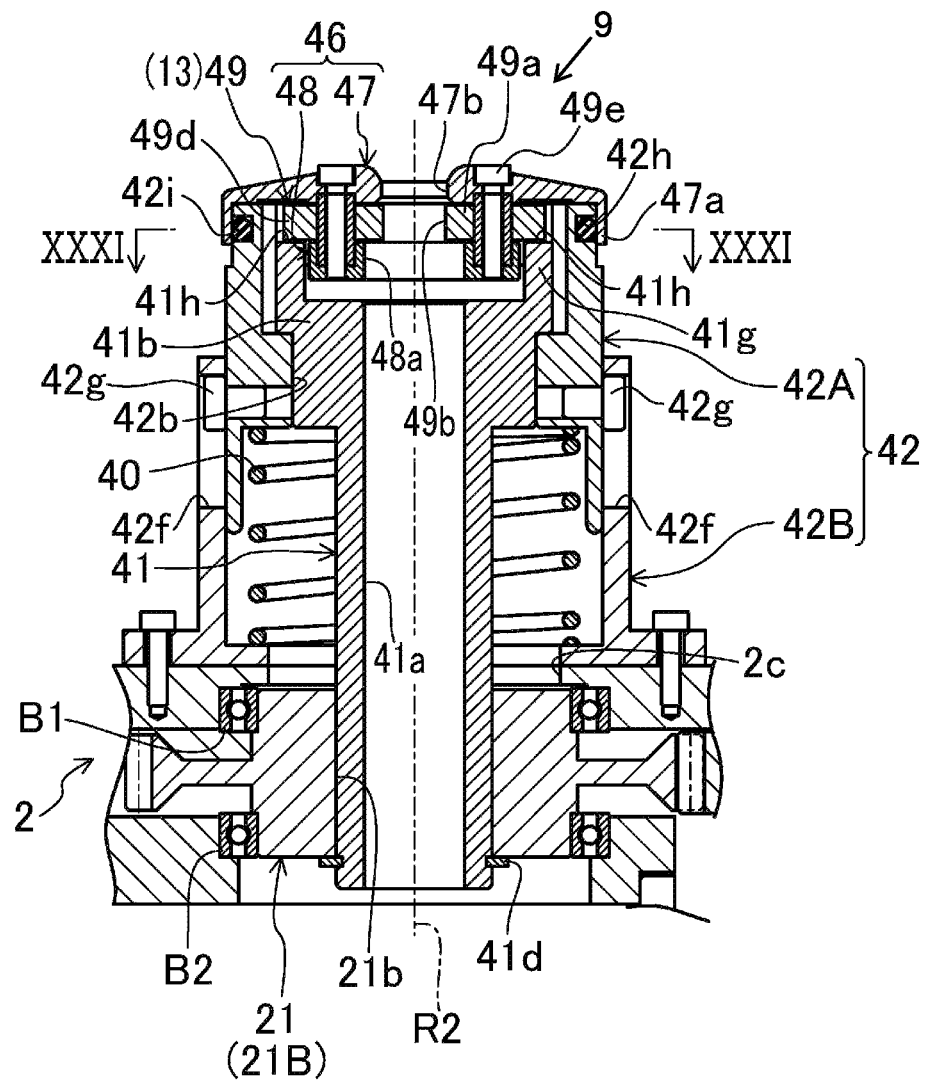
Figure 31:
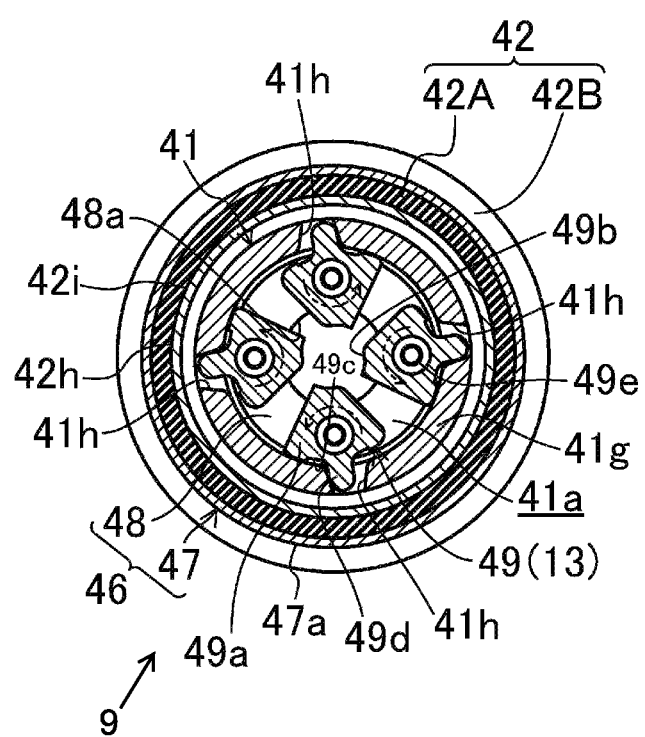
FIG. 31 is a cross-sectional view taken along the plane XXXI-XXXI shown in FIG. 30.

The thickened portion 41b of the first rotator 41 according to the third embodiment has, at the top of the outer peripheral edge thereof, an annular wall portion 41g protruding laterally outward and extending upward as shown in FIGS. 30 and 31. The inner peripheral surface of the upper half of the annular wall portion 41g has four depressions 41h, which are depressed radially outward, extend vertically, and are arranged at regular intervals around the rotational axis R2.

An annular body 46, which is rotatable on the rotational axis R2 with its centerline aligned with the rotational axis R2, is provided over the annular wall portion 41g.

The annular body 46 is comprised of: a generally disklike cover plate 47 covering the upper opening of the annular wall portion 41g; and a ring member 48 arranged inside the lower half of the annular wall portion 41g. The ring member 48 has a hole 48a at its center.

The cover plate 47 has, on its outer peripheral edge, an annular extension 47a protruding downward and extending annularly along the outer peripheral edge of the cover plate 47. The cover plate 47 also has, at its center, a tip insertion hole 47b facing the upper opening of the hole 48a.

Inside the upper half of the annular wall portion 41g, four press claws 49 (serving as exemplary interlocking members), each having a generally arrow shape in a plan view, are arranged at regular intervals around the rotational axis R2. Each of these press claws 49 is arranged to face an associated one of the depressions 41h.

Each of the press claws 49 includes a generally fan-shaped claw body portion 49a, of which the width gradually decreases toward the rotational axis R2 in a plan view. One end facet of the claw body portion 49a closer to the rotational axis R2 is a gently curved face 49b, which is depressed radially outward.

On the other hand, the other end facet of each press claw 49 more distant from the rotational axis R2 has a level difference face portion 49c, of which a center portion is slightly depressed with respect to both end portions thereof. At the center of the level difference face portion 49c, a projection 49d to loosely fit into an associated one of the depressions 41h is provided so as to protrude laterally outward.

The respective press claws 49 and the annular body 46 together form a clamping tool 9 according to the present disclosure. The press claws 49 are pivotally supported by the cover plate 47 and the ring member 48 with vertically extending screws (spindles) 49e, and are pivotally movable toward the rotational axis R2.

The housing case 42 according to the third embodiment includes a cylindrical upper case portion 42A forming an upper part thereof and a cylindrical lower case portion 42B forming a lower part thereof. The upper case portion 42A is fitted into the lower case portion 42B so as to be vertically slidable with its cylinder centerline aligned with the cylinder centerline of the lower case portion 42B.

The upper half of the lower case portion 42B has a plurality of vertically extending slits 42f around the cylinder centerline.

Meanwhile, a plurality of pins 42g to fit into the respective slits 42f are attached to a middle portion of the outer peripheral surface of the upper case portion 42A. As the upper case portion 42A slides vertically, the respective slits 42f guide the pins 42g.

The annular projection 42b according to the third embodiment is provided at a middle of the inner peripheral surface of the upper case portion 42A.

The protruding portion of the annular projection 42b abuts with the bottom of the annular wall portion 41g of the first rotator 41 from under the annular wall portion 41g. The protruding surface of the annular projection 42b makes a slidable contact with the outer peripheral surface of the thickened portion 41b of the first rotator 41.

The outer peripheral surface of the upper part of the upper case portion 42A has an annular fitting recess 42h, in which an O-ring 42i is fitted.

The upper part of the upper case portion 42A is located inside the annular extension 47a of the cover plate 47 such that the outer peripheral edge of the O-ring 42i contacts with the inner peripheral surface of the annular extension 47a.

A sixth coil spring 40 (serving as an exemplary fourth biasing member) is arranged inside the lower case portion 42B and externally fitted onto the first rotator 41.

The bottom of the sixth coil spring 40 abuts with the bottom portion of the lower case portion 42B. On the other hand, the top of the sixth coil spring 40 abuts with the bottom portion of the annular projection 42b. Thus, the sixth coil spring 40 biases the first rotator 41 upward via the upper case portion 42A.

Figure 32:
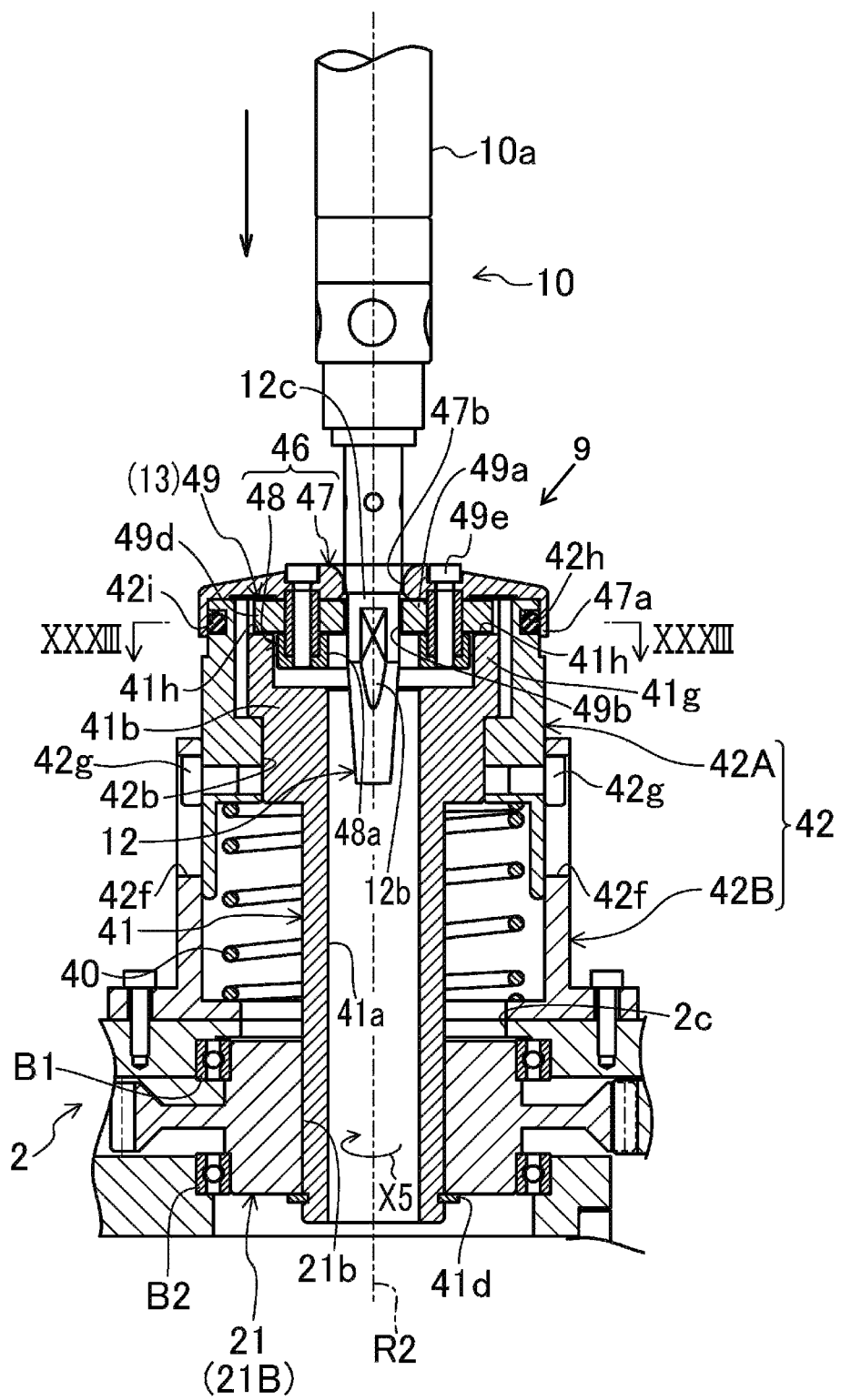
FIG. 32 is a view corresponding to the cross-sectional view of FIG. 30 and illustrating a state where the contact tip that has been inserted into the rotator of a changer unit has just started to be removed from the tip end of the torch body.
Figure 33:
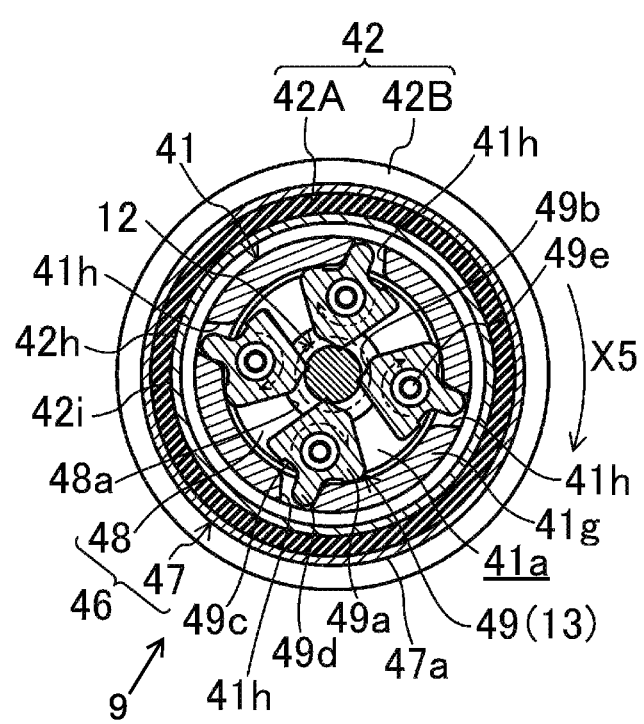
FIG. 33 is a cross-sectional view taken along the plane XXXIII-XXXIII shown in FIG. 32.

Then, the first rotator 41 is allowed to rotate in the normal direction rotation direction on the rotational axis R2 with the contact tip 12 inserted through the tip insertion hole 47b into the through hole 41a as shown in FIGS. 32 and 33. This relative normal direction rotation of the first rotator 41 with respect to the clamping tool 9 makes the inner surface of each depression 41h press its associated projection 49d in the normal direction rotation direction. This allows each of the press claws 49 to pivotally move forward toward the rotational axis R2, thus pressing the outer peripheral surface of the contact tip 12 and clamping the contact tip 12.

That is to say, the press claws 49 serve as the positioning member 13 according to the present disclosure. The press claws 49 are configured to pivotally move forward or backward in a direction intersecting with the rotational axis R2, to come into contact, and get interlocked, with the outer peripheral surface of the contact tip 12, and to bring the center axis of the contact tip 12 into alignment with the rotational axis R2, or at least make the former axis proximate to the latter, when allowed to move forward with the contact tip 12 housed in the through hole 41a.

Furthermore, with the press claws 49 interlocked with the contact tip 12, further rotating the first rotator 41 in the normal direction rotation direction allows the contact tip 12 to turn along with the clamping tool 9 and thereby be removed from the torch body 10a.

Figure 34:
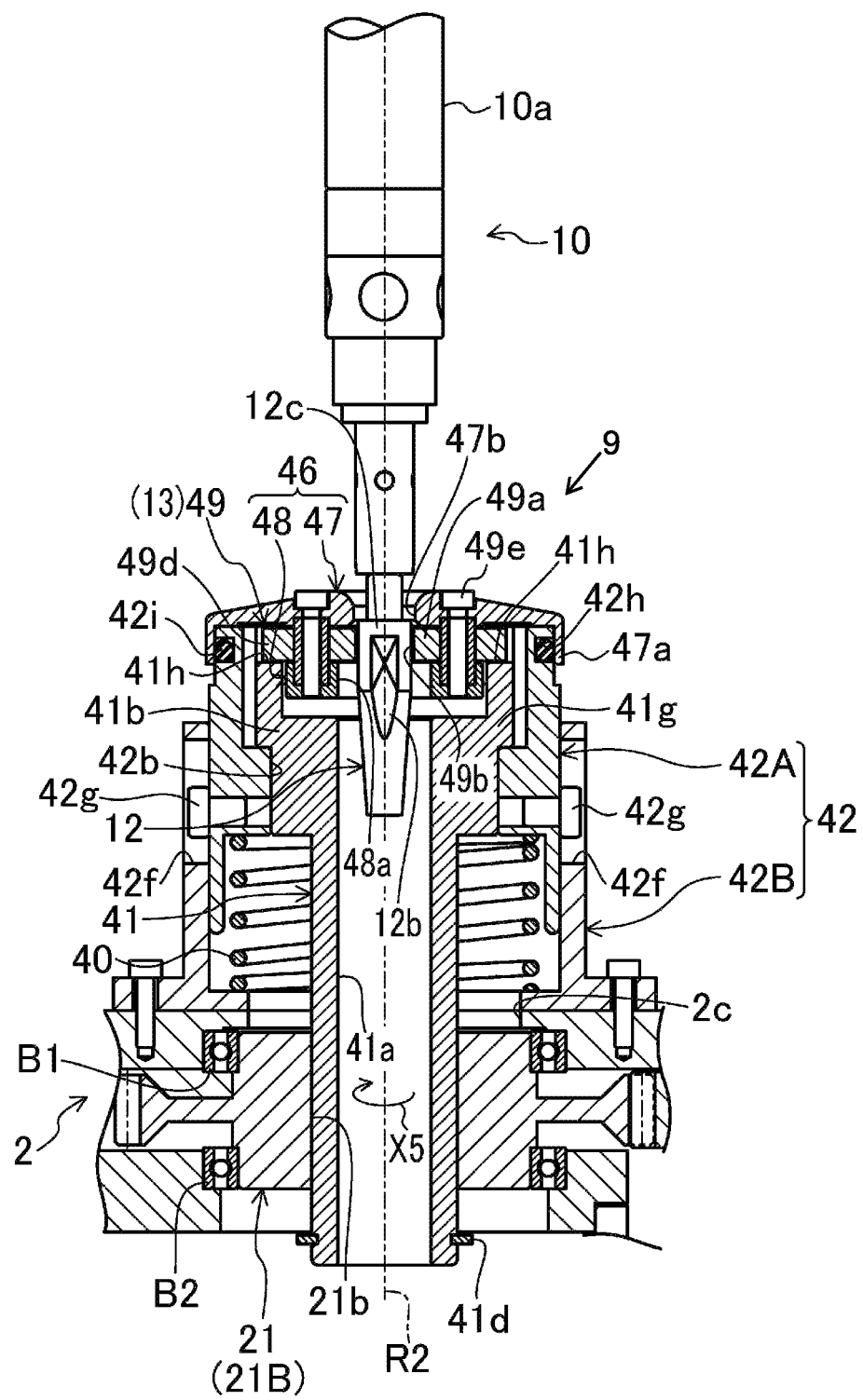
FIG. 34 is a view corresponding to the cross-sectional view of FIG. 30 and illustrating a state where the contact tip has just been removed from the tip end of the torch body.

In this case, the contact tip 12 has been screwed on, and coupled to, the torch body 10a. Thus, as the contact tip 12 is downwardly screwed off the torch body 10a with respect to the torch body 10a by the normal direction rotation direction rotation of the first rotator 41, the first rotator 41 will gradually go out of engagement with the torch body 10a against the biasing force of the sixth coil spring 40 as shown in FIG. 34. This substantially prevents screwing the contact tip 12 during the removal work of the contact tip 12 from imposing excessive load onto either the first rotator 41 or the torch body 10a to cause deformation or damage to the first rotator 41 or the torch body 10a.

On the other hand, rotating the first rotator 41 in the reverse rotation direction with respect to the clamping tool 9 will allow the inner surface of each depression 41h to press an associated one of the projections 49d in the reverse rotation direction. Then, each of the press claws 49 pivotally moves backward in the direction away from the rotational axis R2 to go out of contact with the outer peripheral surface of the contact tip 12. In this manner, the press claws 49 are disengaged from the contact tip 12. Thus, the contact tip 12 is allowed to drop through the through hole 41a and be disposed of.

Next, it will be described how the removal unit 4 of the third embodiment removes and disposes of the contact tip 12.

After the nozzle 11 has been removed by the nozzle replacement unit 3, the welding torch 10 is transported by an industrial robot (not shown) to a standby position over the removal unit 4.

Subsequently, the contact tip 12 is inserted through the tip insertion hole 47b into the through hole 41a of the first rotator 41 from over the removal unit 4 with the welding torch 10 moved downward. When the middle portion of the contact tip 12 reaches a position where the middle portion faces the respective press claws 49, the downward movement of the welding torch 10 is stopped.

Next, the servomotor 6 is started to rotate the first rotator 41 in the direction X5 via the gears 21A and 21B. Then, the first rotator 41 rotates in the normal direction rotation direction with respect to the clamping tool 9, thus making the respective inner surfaces of the depressions 41h press the respective projections 49d in the normal direction rotation direction. Subsequently, as shown in FIGS. 32 and 33, the respective press claws 49 pivotally move forward toward the rotational axis R2, thus pressing the outer peripheral surface of the contact tip 12 and clamping the contact tip 12.

Thereafter, the first rotator 41 is allowed to further rotate in the normal direction rotation direction, namely, direction X5. Then, the contact tip 12 will rotate with the clamping tool 9 to be eventually removed from the torch body 10a. In the meantime, the contact tip 12 gradually screws off downward with respect to the torch body 10a as shown in FIG. 34. Thus, the upper case portion 42A slides downward against the biasing force of the sixth coil spring 40. Alternatively, the torch body 10a may be allowed to move gradually upward while the contact tip 12 is screwing off downward.

After that, the torch body 10a is moved upward. Then, the upper case portion 42A slides upward under the biasing force of the sixth coil spring 40.

Figure 35:
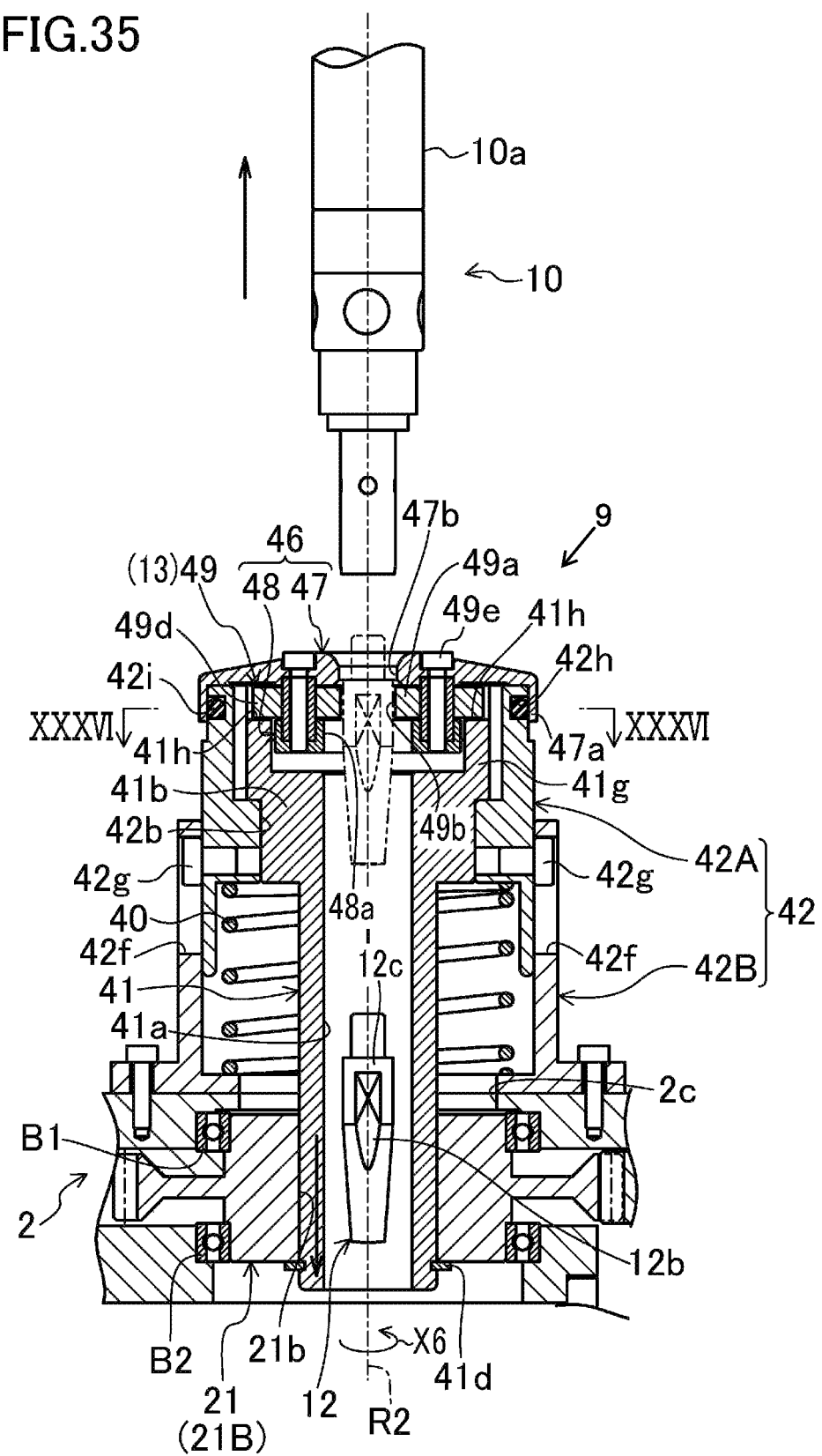
Figure 36:
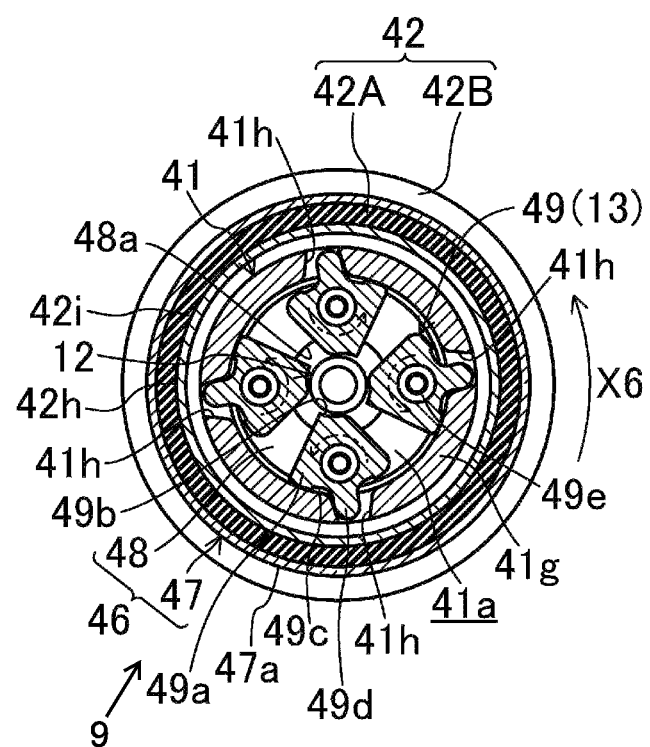
FIG. 36 is a cross-sectional view taken along the plane XXXVI-XXXVI shown in FIG. 35.

Next, the servomotor 6 is started to rotate the first rotator 41 in the direction X6 via the gears 21A and 21B. Then, the first rotator 41 rotates in the reverse rotation direction with respect to the clamping tool 9, thus making the respective inner surfaces of the depressions 41h press the respective projections 49d in the reverse rotation direction. Subsequently, as shown in FIGS. 35 and 36, the respective press claws 49 pivotally move backward in the direction away from the rotational axis R2, thereby disengaging themselves from the outer peripheral surface of the contact tip 12. Thus, the contact tip 12 drops through the through hole 41a and is disposed of.

As can be seen from the foregoing description, according to the third embodiment of the present disclosure, as the first rotator 41 is rotated to attach the contact tip 12 onto the torch body 10a, the respective claws' 49 pressing force on the contact tip 12 will increase to the point that the clamping tool 9 grips the contact tip 12 firmly. This eliminates slip between the clamping tool 9 and the contact tip 12 during the removal, thus allowing the contact tip 12 to be removed from the torch body 10a with reliability.

In addition, the contact tip 12 may be clamped with the rotational force of the first rotator 41 while the contact tip 12 is being removed. This eliminates the need for clamping the contact tip 12 by separately providing an additional drive source other than the servomotor for driving the first rotator 41 in rotation. Consequently, a rotary changer 1 with a simplified structure and a smaller size is provided at a reduced cost.

In the third embodiment of the present disclosure, the contact tip 12 that has been screwed on, and coupled to, the torch body 10a is removed by the removal unit 4 from the torch body 10a. However, this is only an example. The removal unit 4 according to the third embodiment of the present disclosure may also serve as an attachment unit, and may be used to attach or remove a contact tip 12, configured to be fitted and coupled to the torch body 10a, to/from the torch body 10a. That is to say, bringing the torch body 10a either closer to, or away from, the contact tip 12 being turned by the removal unit 4 may also allow the contact tip 12 to be either attached onto, or removed from, the torch body 10a.

The removal unit 4 of the third embodiment may also be used to attach or remove not only the contact tip 12 but also the nozzle 11 to be screwed on and coupled to the torch body 10a or the nozzle 11 to be fitted and coupled to the torch body 10a.

The present disclosure is useful for a rotary changer for replacing a nozzle or a contact tip attached to a tip end portion of the torch body of a welding torch for use in arc welding.

What is claimed is:

1. A rotary changer comprising
   a rotator including openings in first and second directions along its rotational axis and having a hollow inside, the hollow being able to house a cylindrical or bar-shaped torch component of a welding torch from the opening in the first direction along the rotational axis such that the center axis of the torch component is aligned with the rotational axis of the rotator;
   an interlocking member provided in the hollow, and configured to move forward or backward in a direction intersecting with the rotational axis, and:
      when moving forward with the torch component housed in the hollow, to come into contact, and get engaged, with an outer peripheral surface of the torch component to make the center axis proximate to or in alignment with the rotational axis when allowed to move forward with the torch component being housed in the hollow, and
      when moving backward, to go out of contact with, and get disengaged from, the outer peripheral surface of the torch component,
      wherein the rotary changer is configured to attach or remove the torch component onto or from a torch body by allowing the torch component to turn on its center axis through rotary movement of the rotator with the interlocking member being engaged with the torch component;
   a clamping tool comprising:
      a plurality of interlocking members including the interlocking member; and
      an annular member, the annular member attached to the rotator and configured to be rotatable with respect to the rotator with a centerline of the annular member aligned with the rotational axis of the rotator, and the plurality of the interlocking members being arranged at regular intervals inside the rotator and around the rotational axis and pivotally supported by the annular member with a spindle extending in the same direction as the rotational axis so as to be pivotally movable toward the rotational axis; and
   a coil spring externally fitted onto the rotator and configured to bias the rotator in the first direction along the rotational axis,
   wherein an inner peripheral surface of the rotator has a plurality of depressions opening toward the rotational axis and arranged in association with the respective interlocking members at regular intervals around the rotational axis,
   wherein each of the interlocking members has a projection loosely fitting into an associated one of the depressions,
   wherein rotating the rotator on the rotational axis in a normal direction rotation direction with the torch component being housed in the hollow causes an inner face of each of the depressions to press an associated one of the projections in the normal direction rotation direction through the normal direction rotation of the rotator with respect to the clamping tool thereby allowing each of the interlocking members to pivotally move forward toward the rotational axis, press the outer peripheral surface of the torch component, and clamp the torch component, and
   wherein further rotating the rotator in the normal direction rotation direction allows the torch component to turn along with the clamping tool and to thereby be attached onto, or removed from, the torch body.

* * * * *